US012051305B2

(12) United States Patent
Berman

(10) Patent No.: US 12,051,305 B2
(45) **Date of Patent: *Jul. 30, 2024**

(54) GAMING DEVICES AND METHODS FOR ENRICHING SUBSEQUENT GAMING ACTIVITY BASED ON CURRENT GAMING ACTIVITY

(71) Applicant: KING SHOW GAMES, INC., Minnetonka, MN (US)

(72) Inventor: Bradley Berman, Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,816

(22) Filed: Jan. 9, 2023

(65) Prior Publication Data

US 2023/0144862 A1 May 11, 2023

Related U.S. Application Data

(63) Continuation of application No. 16/673,441, filed on Nov. 4, 2019, now Pat. No. 11,551,525.

(60) Provisional application No. 62/755,699, filed on Nov. 5, 2018.

(51) Int. Cl.
*G07F 17/32* (2006.01)

(52) U.S. Cl.
CPC ...... *G07F 17/3267* (2013.01); *G07F 17/3211* (2013.01); *G07F 17/3227* (2013.01); *G07F 17/3244* (2013.01); *G07F 17/3262* (2013.01); *G07F 17/3276* (2013.01); *G07F 17/3293* (2013.01); *G07F 17/3239* (2013.01)

(58) Field of Classification Search
CPC ............. G07F 17/3267; G07F 17/3211; G07F 17/3227; G07F 17/3244; G07F 17/3262; G07F 17/3276; G07F 17/3293; G07F 17/3239
USPC ............................................................ 463/13
See application file for complete search history.

(56) References Cited

U.S. PATENT DOCUMENTS

| | | | | |
|---|---|---|---|---|
| 5,531,448 | A | 7/1996 | Moody | |
| 5,732,950 | A | 3/1998 | Moody | |
| 5,823,873 | A | 10/1998 | Moody | |
| 6,007,066 | A | 12/1999 | Moody | |
| 6,098,985 | A | 8/2000 | Moody | |
| 6,159,095 | A | 12/2000 | Frohm et al. | |
| 6,203,429 | B1 | 3/2001 | Demar et al. | |
| 6,312,334 | B1 | 11/2001 | Yoseloff | |
| 6,419,578 | B1 | 7/2002 | Moody et al. | |
| 6,672,959 | B2 | 1/2004 | Moody et al. | |
| 7,156,397 | B2 | 1/2007 | Moody et al. | |
| 7,740,533 | B2 * | 6/2010 | Walker | G07F 17/3293 463/19 |
| 8,690,659 | B2 | 4/2014 | Moody | |

(Continued)

OTHER PUBLICATIONS

The Wizard of Odds, "Wheel Poker Deluxe", Mar. 2, 2019.
www.888casino.com, "Quick Quads Poker", Mar. 7, 2018.

*Primary Examiner* — Robert P Bullington
*Assistant Examiner* — Stephen Alvesteffer

(57) ABSTRACT

Systems, apparatuses and methods for providing heightened anticipation in poker games and other gaming activities where game indicia locations track across poker deals or other gaming events. In a poker context, card positions of a current poker hand(s) may be randomly or otherwise identified, and those card positions of a subsequent poker hand(s) will be accorded some heightened value and/or other enrichment.

20 Claims, 11 Drawing Sheets

(56) References Cited

U.S. PATENT DOCUMENTS

| | | | | |
|---|---|---|---|---|
| 9,067,144 | B1 | 6/2015 | Nottke | |
| 9,138,634 | B2 | 9/2015 | Moody | |
| 9,569,934 | B2 | 2/2017 | Berman | |
| 9,576,431 | B2 | 2/2017 | Berman et al. | |
| 9,576,437 | B2 | 2/2017 | Berman | |
| 9,916,731 | B2 | 3/2018 | Allen et al. | |
| 10,008,075 | B2 | 6/2018 | Berman | |
| 10,176,675 | B2 | 1/2019 | Moody et al. | |
| 10,553,080 | B2 | 2/2020 | Berman | |
| 2003/0032469 | A1 | 2/2003 | Moody et al. | |
| 2003/0040352 | A1 | 2/2003 | Marks et al. | |
| 2003/0157977 | A1 | 8/2003 | Thomas et al. | |
| 2004/0116170 | A1 | 6/2004 | Walker et al. | |
| 2007/0238503 | A1 | 10/2007 | Kowell | |
| 2008/0102918 | A1 | 5/2008 | Campagno et al. | |
| 2009/0061975 | A1 | 3/2009 | Ditchev | |
| 2009/0104958 | A1 | 4/2009 | Jackson | |
| 2009/0298569 | A1 | 12/2009 | Sims et al. | |
| 2011/0039610 | A1* | 2/2011 | Baerlocher | G07F 17/3293 463/43 |
| 2011/0117980 | A1* | 5/2011 | Parham | G07F 17/32 463/13 |
| 2012/0270622 | A1* | 10/2012 | Pawloski | G07F 17/32 463/11 |
| 2013/0072275 | A1 | 3/2013 | Brien | |
| 2013/0079123 | A1* | 3/2013 | Nicely | G07F 17/3262 463/25 |
| 2014/0045579 | A1 | 2/2014 | Filipour et al. | |
| 2014/0206424 | A1 | 7/2014 | Taylor | |
| 2014/0302903 | A1 | 10/2014 | Berman et al. | |
| 2018/0130305 | A1 | 5/2018 | Berman et al. | |
| 2019/0088075 | A1* | 3/2019 | Alderucci | G07F 17/3227 |
| 2021/0174645 | A1* | 6/2021 | Moody | G07F 17/3211 |

* cited by examiner

GAMING DEVICES AND METHODS FOR ENRICHING SUBSEQUENT GAMING ACTIVITY BASED ON CURRENT GAMING ACTIVITY

RELATED APPLICATIONS

This application is a continuation of U.S. application Ser. No. 16/673,441, filed Nov. 4, 2019, now U.S. Pat. No. 11,551,525, which claims the benefit of Provisional Patent Application No. 62/755,699, filed on Nov. 5, 2018, to which priority is claimed pursuant to 35 U.S.C. § 119(e) and which is incorporated herein by reference in its entirety.

FIELD

This disclosure relates generally to games, and more particularly to systems, apparatuses and methods for identifying positions of card hands that will be accorded some heightened value or enrichment on a future hand(s) of the game.

BACKGROUND

Casino games such as poker, slots, and craps have long been enjoyed as a means of entertainment. Some of these games originated using traditional elements such as playing cards or dice. More recently, gaming devices have been developed to simulate and/or further enhance these games while remaining entertaining. The popularity of casino gambling with wagering continues to increase, as does recreational gambling such as non-wagering computer game gambling. Part of this popularity is due to the increased development of new types of games that are implemented, at least in part, on gaming devices.

One reason that casino games are widely developed for gaming devices is that a wide variety of games can be implemented on gaming devices, thereby providing an array of choices for players looking to gamble. For example, the graphics and sounds included in such games can be modified to reflect popular subjects, such as movies and television shows. Game play rules and types of games can also vary greatly providing many different styles of gambling. Additionally, gaming devices require minimal supervision to operate on a casino floor, or in other gambling environments. That is, as compared to traditional casino games that require a dealer, banker, stickman, pit managers, etc., gaming devices need much less employee attention to operate.

With the ability to provide new content, players have come to expect the availability of an ever wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill, although some skill may be an element in some types of games. Since random chance is a significant component of these games, they are sometimes referred to as "games of chance."

The present disclosure describes systems, apparatuses and methods that facilitate new and interesting gaming experiences, and provide advantages over the prior art.

SUMMARY

The present disclosure is directed to systems, apparatuses, computer-readable media, and/or methods that are configured to identify positions of card hands that will be accorded some heightened value and/or other enrichment on a future hand(s) of the game.

In accordance with one embodiment, a gaming device for playing a poker game is provided. The gaming device includes a display, a user interface configured to receive at least player input to facilitate player participation in the poker game, a wager input device structured to identify and validate player assets and permit the player to play the poker game when the player assets are provided, and a processor. In one embodiment, the processor is configured to cause the display to present a first hand of cards in response to player assets being allocated via the wager input device to participate in the first hand of cards. The processor randomly designates zero, one or more of the card positions of the first hand of cards as approved for subsequent hand enrichment, and causes the display to present a second hand of cards at respective card positions in response to the player assets being allocated via the wager input device to participate in the second hand of cards. If the processor determines that any of the card positions of the first hand of cards were approved for subsequent hand enrichment, the processor assigns an enriched card to each of the card positions of the second hand of cards that corresponds to the card positions randomly designated for subsequent hand enrichment in the first hand of cards.

In one embodiment of such a gaming device, the processor further obtains a first hand result for the first hand of cards, and obtains a second hand result using the assigned enriched cards for the second hand of cards if one or more of the card positions of the first hand of cards were randomly designated as approved for subsequent hand enrichment.

Another variation of such a gaming device involves the processor continuing the process for further hands. For example, the processor may be further configured to randomly designate zero, one or more of the card positions of the second hand of cards as approved for the subsequent hand enrichment, cause the display to present a third hand of cards at respective card positions in response to the player assets being allocated via the wager input device to participate in the third hand of cards, and if one or more of the card positions of the second hand of cards were randomly designated as approved for subsequent hand enrichment, assign an enriched card to each of the one or more card positions of the third hand of cards that corresponds to the one or more of the card positions randomly designated as approved for subsequent hand enrichment in the second hand of cards. This can continue for any number of hands of cards. More generally, the processor may be configured to cause the display to present an Nth hand of cards in response to player assets being allocated via the wager input device to participate in the Nth hand of cards, randomly designate zero, one or more of the card positions of the Nth hand of cards as approved for the subsequent hand enrichment, cause the display to present an (N+1)th hand of cards at respective card positions in response to the player assets being allocated via the wager input device to participate in the (N+1)th hand of cards, and if one or more of the card positions of the Nth hand of cards were randomly designated as approved for subsequent hand enrichment, assign an enriched card to each of the one or more card positions of the (N+1)th hand of cards that corresponds to the one or more of the card positions randomly designated as approved for subsequent hand enrichment in the Nth hand of cards.

In another embodiment of such a gaming device, the processor is configured to assign different ones of the enriched cards to each of the one or more card positions of the second hand of cards that corresponds to the one or more of the card positions randomly designated as approved for subsequent hand enrichment in the first hand of cards, if a plurality of the card positions of the second hand of cards were randomly designated as approved for subsequent hand enrichment. In an alternative embodiment, the enriched card may be a fixed card for each assignment of the enriched cards on any of the hands approved for subsequent hand enrichment, such as, for example, a wild card. In still other embodiments, the enriched card may be selected from a pool of available enriched cards, such as, for example, a pool of wild cards, wild cards plus a multiplier, and/or other high value cards based on the poker game played and/or the particular hand(s) being played by the player. As one example, the processor may be configured to select the enriched card, based on other cards in the hand that is approved for subsequent hand enrichment.

In accordance with another embodiment, a gaming apparatus provides enriched cards in a multi-hand electronic draw poker game. The gaming apparatus includes a display, a user interface including at least one user input to enable a player to initiate play of the plurality of concurrently-played poker hand events, a wager input device structured to identify and validate player assets and permit the player to play the plurality of concurrently-played poker hand events when the player assets are provided, and a processor. In this embodiment, the processor is configured to cause the display to present a first poker game including a first draw poker hand having card positions, and at least one additional poker hand having corresponding card positions, in response to the player providing first player assets. The processor facilitates player holding of any one or more of cards of the first draw poker hand, and replicating the held cards of the first draw poker hand into corresponding card positions of the additional poker hand(s). The processor is configured to provide replacement cards for the cards that were not held in the first draw poker hand, and for the corresponding card positions of the additional poker hand(s). The processor randomly designates zero, one, or more of the card positions of the first poker game, including the first draw poker hand and the additional poker hand(s), as being approved for subsequent hand enrichment. The processor is further configured to cause the display to present a second poker game including a second draw poker hand having card positions, and at least one additional poker hand having corresponding card positions, in response to the player providing second player assets. If the processor determines that one or more of the card positions of the first poker game were randomly designated as approved for subsequent hand enrichment, the processor assigns an enriched card to each of the one or more card positions of the second poker game that corresponds to the card positions randomly designated as approved for subsequent hand enrichment in the first poker game.

In another embodiment of such a gaming apparatus, the processor is further configured to determine payouts for the first draw poker hand and the at least one additional poker hands after replacement cards are provided in the first poker game, and to determine payouts for the second poker game using the assigned enriched cards.

In another embodiment of the gaming apparatus, the processor is further configured to cause the display to present the second poker game including a second draw poker hand having card positions, and at least one second poker game additional poker hand having corresponding card positions to the second draw poker hand, in response to the player providing the second player assets. The processor further facilitates the player's holding of any one or more of the cards of the second draw poker hand, and replicates any held cards of the second draw poker hand into the corresponding card positions of the second poker game additional poker hand(s). The processor provides replacement cards for the cards that were not held in the second draw poker hand, and for the corresponding card positions of the second poker game additional poker hand(s), and determines results for the second poker game using the assigned enriched cards. In a more particular embodiment, the processor is configured to randomly designate zero, one or more of the card positions of the second poker game, including the second draw poker hand and the second poker game additional poker hand(s), as approved for hand enrichment of a third or later poker game.

In another embodiment of such a gaming apparatus, the processor is configured to randomly designate the one or more card positions of the first poker game before, during, or after provision of the replacement cards for the cards not held in the first draw poker hand, where one or more of the card positions of the first poker game were randomly designated as approved for subsequent hand enrichment. In an alternative embodiment, the processor is configured to randomly designate one or more card positions of the first poker game before provision of the replacement cards, and to randomly designate one or more of the card positions of the first poker game after provision of the replacement cards, where a plurality of the card positions of the first poker game were randomly designated as approved for subsequent hand enrichment.

In accordance with another embodiment, a method for operating a video poker system is provided. The method includes enabling participation in a first poker game of the video poker system in response to player assets being allocated via a user interface accessible to a player, and in response to enabling such participation in the first poker game, utilizing a processor to determine a first hand of cards and to cause a display to present the first hand of cards to the player. The method includes randomly designating, via the processor, one or more of the card positions of the first hand of cards as approved for subsequent hand enrichment, and causing the display to highlight, delineate, mark, or otherwise identify the card positions of the first hand of cards that were randomly designated for subsequent hand enrichment. The processor facilitates completion of the first poker game. Participation in a second poker game of the video poker system is enabled in response to the player assets being allocated via the user interface. If it is determined, such as via the processor, that one or more of the card positions of the first hand of cards were randomly designated for subsequent hand enrichment, the method includes assigning, via the processor, an enriched card to each of the card positions of a second hand of cards of the second poker game that corresponds to the card positions randomly designated for subsequent hand enrichment in the first hand of cards. The enriched cards are displayed at each of the card positions of the second hand of cards that corresponds to the card positions randomly designated for subsequent hand enrichment in the first hand of cards. The method further includes facilitating, via the processor, completion of the second poker game using the enriched cards at each of the one or more card positions of the second hand of cards.

In another embodiment of such a method, the first poker game and the second poker game comprise poker game variants selected from the group comprising stud poker, draw poker, hold'em poker, three-card poker, pai gow poker, and/or any other poker variants where games may be, for example, played sequentially.

In another embodiment, the method includes assigning, via the processor, a wild card as the enriched card to each of the card positions of a second hand of cards of the second poker game that corresponds to the card positions randomly designated for subsequent hand enrichment in the first hand of cards, and presenting, via the processor, those wild cards as the enriched cards at each of the corresponding card positions of the second hand of cards.

This summary serves as an abbreviated, selective introduction of a representative subset of various concepts and embodiments that are further described or taught to those skilled in the art in the Specification herein. This summary is not intended to refer to all embodiments, scopes, or breadths of claims otherwise supported by the Specification, nor to identify essential features of the claimed subject matter, nor to limit the scope of the claimed subject matter.

DETAILED DESCRIPTION

Figure 1:
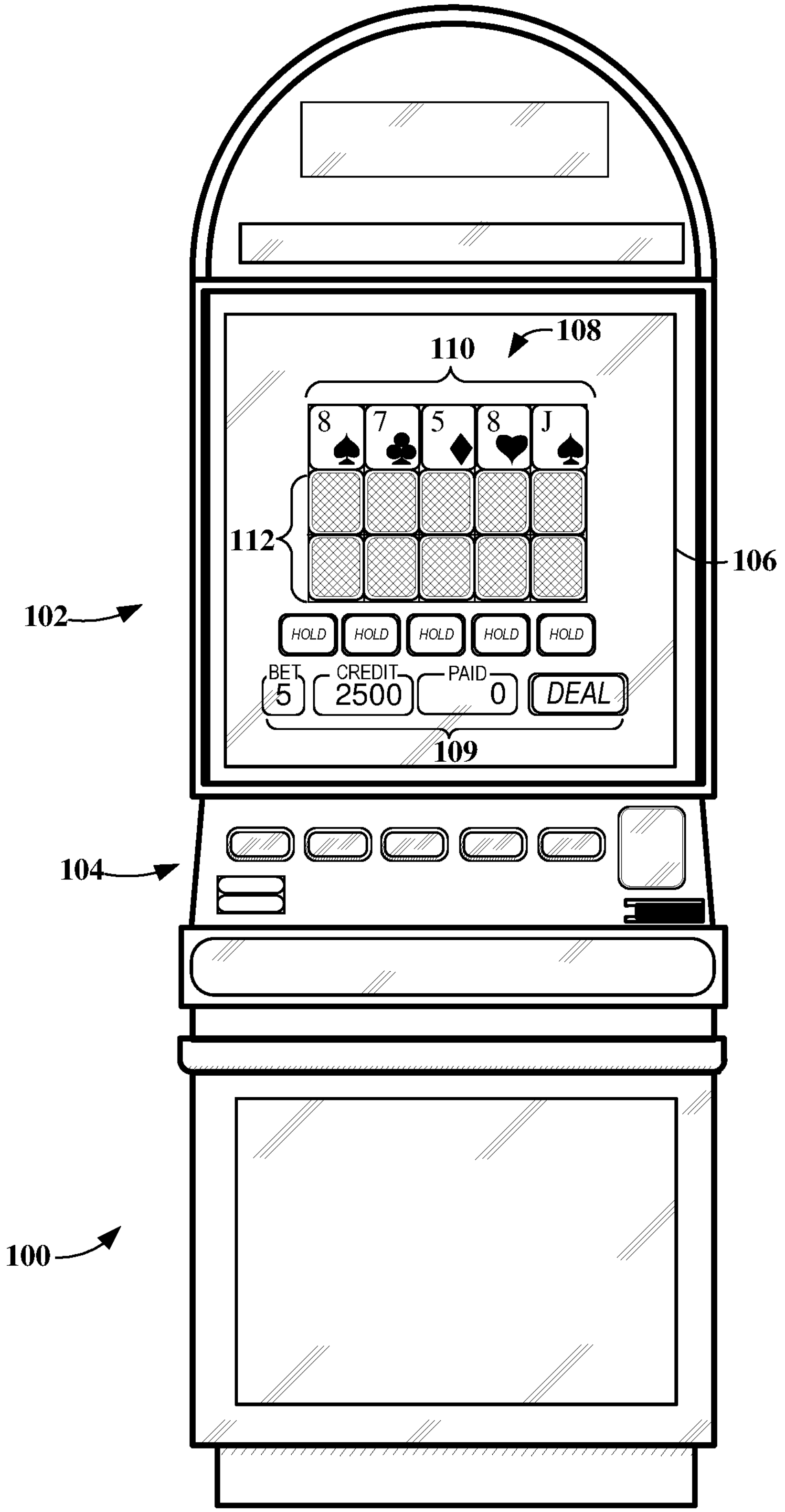
FIG. 1 is a diagram of a representative gaming machine capable of facilitating player use and interaction with games and features in accordance with the invention and representative embodiments described herein.

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

In the description that follows, the terms "reels," "cards," "decks," and similar mechanically descriptive language may be used to describe various apparatus presentation features, as well as various actions occurring to those objects (e.g., "spin," "draw," "hold," "bet"). Although the present disclosure may be applicable to manual, mechanical, and/or computerized embodiments, as well as any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., spinning, holding, drawing, betting). Further, the computerized version may provide the look of mechanical equivalents but may be generally randomized in a different way. Thus, the terms "cards," "decks," "reels," "hands," etc., are intended to describe both physical objects and emulation or simulations of those objects and their behaviors using electronic apparatuses.

In various embodiments, the gaming displays are described in conjunction with the use of data in the form of "symbols." In the context of this disclosure, a "symbol" may generally refer at least to a collection of one or more arbitrary indicia or signs that have some conventional or defined significance. In particular, the symbol may represent values that can at least be used to determine whether to award a payout. A symbol may include numbers, letters, shapes, pictures, textures, colors, sounds, etc., and any combination therebetween. A play state, such as a win, can be determined by comparing the symbol with one or more other symbols. Such comparisons can be performed, for example, via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

Generally, systems, apparatuses and methods are disclosed for identifying card positions, in hands of poker or other card games, that will be accorded some heightened value or enrichment on a future hand(s) of the game. The systems, apparatuses and methods described herein may be implemented as a single game, or part of a multi-part game. For example, the game features described herein may be implemented in primary gaming activities, bonus games, side bet games or other secondary games associated with a primary gaming activity. The game features may be implemented in stand-alone games, multi-player games, etc. Further, the disclosure may be applied to games of chance, and descriptions provided in the context of any representative game (e.g. poker, such as video poker) is provided for purposes of facilitating an understanding of the features described herein. However, the principles described herein are equally applicable to any game of chance where an outcome(s) is determined for use in the player's gaming activity.

Embodiments of the present concept include providing gaming devices (also referred to as gaming apparatuses or gaming machines), gaming systems, and methods of operating these devices or systems to provide game play that involves randomly or otherwise identifying game indicia positions in current gaming activities that will have their associated game indicia enriched or otherwise benefitted in one or more future gaming activities.

In one embodiment, the gaming activity comprises a card game, which may involve a single hand of cards or multiple hands of cards. The cards serve as the indicia that enables games to be conducted, through interaction of the card indicia. Cards in a current gaming activity may be marked or otherwise designated at card positions, or alternatively a count of cards, that will be enhanced, enriched, or otherwise exhibit a higher payout potential and/or likelihood of achieving a winning result.

These principles may be applied in a poker context, regardless of the type of poker game. The poker game may involve stud poker variations, draw poker variations, community card poker variations, any combination thereof, or any other wagering game utilizing cards. In one embodiment, one or more cards of a hand(s) in a single or multiple hand game may be randomly or systematically marked, and cards that are dealt to those marked positions in a subsequent hand(s) are benefitted or upgraded in some way, such as changing to a higher value, changing to a card more likely to result in a winning combination (e.g., wild card) and/or higher payout (e.g., multiplier or other payout modifier), etc.

In one embodiment, the precise positions of such cards is not provided, but rather a count of the number of cards (if any) that will be available for subsequent hand upgrades is provided in connection with a current poker game, and that number of cards (if any) will be upgraded or otherwise changed in a future poker game. For example, a random award of two poker card replacements may be awarded on a current poker hand, and on the next (or later) hand, two poker cards will be allowed to change to higher win and/or payout likelihood cards, and/or other enriched or higher value cards. The cards to be changed in such an embodiment may be fixed (e.g., change the number of cards from left to right in the future hand(s)), randomly selected, selected in response to other play conditions or occurrences (e.g., condition-based or rule-based card position selections), or the like.

Numerous variations are possible in view of these and other embodiments of the inventive concept. Representative embodiments and variations are described herein, with some embodiments described with reference to the drawings. However, many other embodiments and variations exist that are covered by the principles and scope of this concept. For example, although some of the embodiments discussed below involve electronic/video poker examples of this concept, other embodiments include application of these inventive techniques in of slot games, other card games, roulette, bingo, keno, or other games of chance. Some of these other types of embodiments will be discussed below as variations to the examples illustrated. However, many other types of games can implement similar techniques and fall within the scope of this disclosed concept.

Referring to the example gaming apparatus 100 shown in FIG. 1, the representative gaming apparatus includes at least a display area(s) 102 (also referred to as a gaming display), and a player interface area(s) 104, although some or all of the interactive mechanisms included in the user interface area 104 may be provided via other or additional means, such as graphical icons used with a touch screen in the display area 102 in some embodiments. The display area 102 may include one or more game displays 106 (also referred to as "displays" or "gaming displays") that may be included in physically separate displays or as portions of a common large display. Here, the representative game display 106 includes at least a primary game play portion 108 that displays game elements and symbols 110, and an operations portion 109 that can include meters, various game buttons and other input mechanisms, and/or other game information for a player of the gaming device 100.

The user interface 104 allows the user to control, engage in play of, and otherwise interact with the gaming machine 100. The particular user interface mechanisms included with user interface 104 may be dependent on the type of gaming device. For example, the user interface 104 may include one or more buttons, switches, joysticks, levers, pull-down handles, trackballs, voice-activated input, touchscreen input, tactile input, and/or any other user input system or mechanism that allows the user to play and interact with the particular gaming activity.

The user interface 104 may allow the user or player to enter coins, bills, or otherwise obtain credits through vouchers, tokens, credit cards, tickets, electronic money, etc. Various mechanisms for entering such vouchers, tokens, credit cards, coins, tickets, etc. are described below with reference to FIG. 2. For example, currency input mechanisms, card readers, credit card readers, smart card readers, punch card readers, radio frequency identifier (RFID) readers, and other mechanisms may be used to enter wagers. The user interface 104 may also include a mechanism to read and/or validate player information, such as player loyalty information to identify a user or player of the gaming device. This mechanism may be, for example, a card reader, biometric scanner, keypad, or other input device. It is through a user interface such as the user interface 104 that the player can initiate and engage in gaming activities. While the illustrated embodiment depicts various buttons for the user interface 104, it should be recognized that a wide variety of user interface options are available for use in connection with the present invention, including pressing buttons, touching a segment of a touch-screen, entering text, entering voice commands, or other known data entry methodology.

The game display 106 in the display area 102 may include one or more of an electronic display, a video display, a mechanical display, and fixed display information, such as pay table information associated with a glass/plastic panel(s) on the gaming machine 100 and/or graphical images. The symbols or other indicia associated with the play of the game may be presented on an electronic display device or on mechanical devices associated with a mechanical display. Generally, in some embodiments, the display 106 devotes the largest portion of viewable area to the primary gaming portion 108. The primary gaming portion 108 may provide visual feedback to the user for any selected game. The primary gaming portion 108 may render graphical objects such as cards, slot reels, dice, animated characters, and any other gaming visual known in the art. The primary gaming portion 108 may also inform players of the outcome of any particular event, including whether the event resulted in a win or loss.

In some embodiments described herein, the primary gaming portion 108 may display a grid(s) or equivalent arrangement(s) of playing cards 110 forming one or more hands or other sets of cards in a card game, such as a poker game. In the illustrated example, a set of five playing cards 110 forms a video poker hand, which represents a portion of a game play event. For example, if the game play event is a video draw poker game, the gaming device 100 may deal five cards, allow the user to select cards to hold, deal replacements for the cards not held, and determine a payout based on the final cards in the hand. The illustration and description of five-card draw poker is for purposes of example and not of limitation, as the disclosure is applicable to numerous other card games, such as stud poker, hold'em poker or other community card poker games, or any other poker game involving sequentially-played poker games or hands, as well as other types of gaming activities and apparatuses, such as slot machines, dice, coins, etc. For example, some embodiments may relate to slot games, where the primary gaming portion 108 presents a grid (or equivalent arrangement) of symbols or other game elements in respective symbol locations (not shown), where the symbols or combinations of symbols determine gaming outcomes.

In some embodiments, the primary gaming portion 108 may also display one or more additional hands 112 of playing cards, such as in a multi-play poker embodiment. For example, one multi-play poker embodiment involves draw poker, where at least one hand 110 is dealt, and cards held by the player in hand 110 are replicated into one or more other hands 112, whereby all hands 110, 112 may then be completed with replacement cards while having one or more commonly held cards. Multi-play embodiments may also be played without holding any cards, and/or without replication of held cards into other hands. In some embodiments, other hands 112 may represent discrete, individually-played additional hands of cards that are unrelated to the play of other hands 110.

The primary gaming portion 108 may include other features known in the art that facilitate gaming, such as status and control portion 109. As is generally known in the art, this portion 109 provides information about current bets, current wins, remaining credits, etc. associated with gaming activities of the grid of game elements 110. The control portion 109 may also provide touchscreen controls for facilitating game play. The grid of game elements 110 may also include touchscreen features, such as facilitating selection of individual cards to hold and/or selection of individual cards to discard and replace (e.g., in a draw poker embodiment), which subset of cards of a larger set of cards to hold/use for a final hand(s) (e.g., in some stud poker embodiments), wagering inputs, etc. The game display 106 of the display area 102 may include other features that are not shown, such as pay tables, navigation controls, etc.

Figure 2:
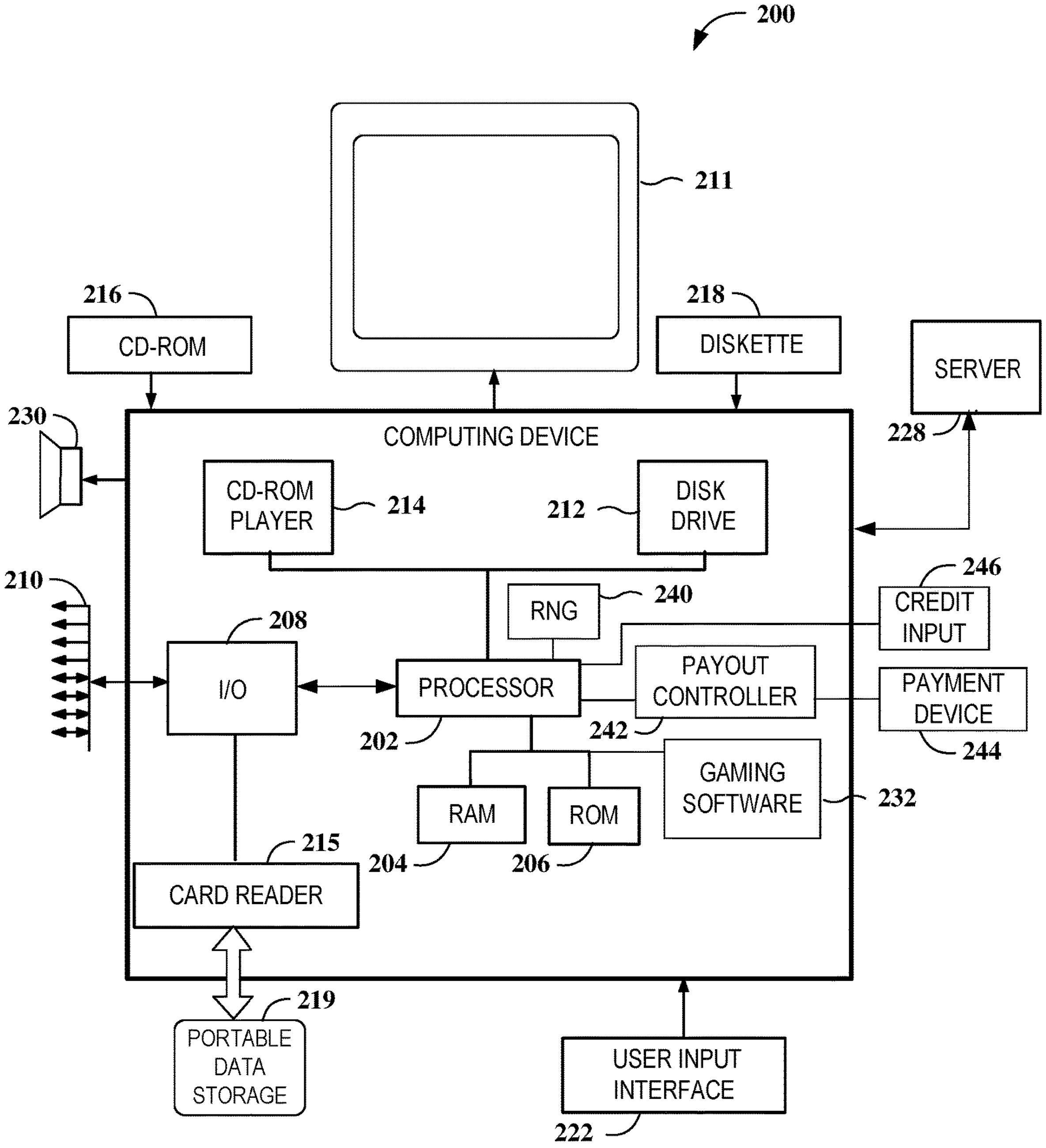
FIG. 2 is a block diagram illustrating a representative computing arrangement capable of implementing games and features in accordance with the invention and representative embodiments described herein.

Although FIG. 1 illustrates a particular implementation of some of the embodiments in a casino or electronic gaming machine ("EGM"), one or more devices may be programmed to play various embodiments of the disclosure. The concepts and embodiments described herein may be implemented, as shown in FIG. 1, as an electronic/video gaming machine or other special purpose gaming kiosk, or may be implemented via computing systems operating under the direction of local gaming software, and/or remotely-provided software such as provided by an application service provider (ASP). Such gaming machines may also utilize computing systems to control and manage the gaming activity, although these computing systems typically include specialized components and/or functionality to operate the particular elements of electronic gaming machines. Additionally, computing systems operating over networks, such as the Internet, may also include specialized components and/or functionality to operate elements particular to these systems, such as random number generators. An example of a representative computing system capable of carrying out operations in accordance with the principles described herein is illustrated in FIG. 2.

Hardware, firmware, software or any combination thereof may be used to perform the various gaming functions, display presentations and operations described herein. The functional modules used in connection with the disclosure may reside in a gaming machine as described, or may alternatively reside on a stand-alone or networked computer. The representative computing structure 200 of FIG. 2 is an example of a computing structure that can be used in connection with such electronic gaming machines, computers, or other computer-implemented devices to carry out operations of the present invention. Although numerous components or elements are shown as part of this computing structure 200 in FIG. 2, additional or fewer components may be utilized in particular implementations of embodiments of the invention.

The example computing arrangement 200 suitable for performing the gaming functions described herein includes a processor(s), such as depicted by the representative central processing unit (CPU) 202, coupled to memory, such as random access memory (RAM) 204, and some variation of read-only memory (ROM) 206 or other persistent storage. The ROM 206 may also represent other types of storage media to store programs, such as programmable ROM (PROM), erasable PROM (EPROM or any technology capable of storing data). The processor 202 may communicate with other internal and external components through input/output (I/O) circuitry 208 and bussing 210, to communicate control signals, communication signals, and the like.

The computing arrangement 200 may also include one or more data storage devices, including hard and floppy disk drives 212, CD-ROM drives 214, card reader 215, and other hardware capable of reading and/or storing information such as DVD, etc. In one embodiment, software for carrying out the operations in accordance with the present invention may be stored and distributed on a CD-ROM 216, diskette 218, access card 219, or other form of computer readable media capable of portably storing information. These storage media may be inserted into, and read by, devices such as the CD-ROM drive 214, the disk drive 212, card reader 215, etc. The software may also be transmitted to the computing arrangement 200 via data signals, such as being downloaded electronically via a network, such as local area network (casino, property, or bank network) or a wide area network (e.g., the Internet). Further, as previously described, the software for carrying out the functions associated with the present invention may alternatively be stored in internal memory/storage of the computing device 200, such as in the ROM 206.

The computing arrangement 200 is coupled to one or more displays 211, which represent a manner in which the gaming activities may be presented. The display 211 represents the "presentation" of the game information in accordance with the disclosure, and may be a mechanical display, or an electronic/video display such as liquid crystal displays, plasma displays, cathode ray tubes (CRT), digital light processing (DLP) displays, liquid crystal on silicon (LCOS) displays, etc., or any type of known display or presentation screen.

Where the computing device 200 represents a stand-alone or networked computer, the display 211 may represent a standard computer terminal or display capable of displaying multiple windows, frames, etc. Where the computing device 200 represents a mobile electronic device, the display 211 may represent the video display of the mobile electronic device. Where the computing device 200 is embedded within an electronic gaming machine, the display 211 corresponds to the display screen of the gaming machine/kiosk.

A user input interface 222 such as a mouse, keyboard/keypad, microphone, touch pad, trackball, joystick, touch screen, voice-recognition system, card reader, biometric scanner, RFID detector, etc. may be provided. The user input interface 222 may be used to input commands in the computing arrangement 200, such as placing wagers or initiating gaming events on the computing arrangement 200, inputting currency or other payment information to establish a credit amount or wager amount, inputting data to identify a player for a player loyalty system, etc. The display 211 may also act as a user input device, e.g., where the display 211 is a touchscreen device. In embodiments, where the computing device 200 is implemented in a personal computer, tablet, smart phone, or other consumer electronic device, the user interface and display may be the available input/output mechanisms related to those devices.

Chance-based gaming systems such as slot machines, in which the present invention is applicable, are governed by random numbers and processors, as facilitated by a random number generator (RNG) or other random generator. The fixed and dynamic symbols generated as part of a gaming activity may be produced using one or more RNGs. RNGs may be implemented using hardware, software operable in connection with the processor 202, or some combination of hardware and software. The principles described herein are operable using any known RNG, and may be integrally programmed as part of the processor 202 operation, or alternatively may be a separate RNG controller 240 that may be associated with the computing arrangement 200 or otherwise accessible such as via a network. The RNGs are often protected by one or more security measures to prevent tampering, such as by using secured circuitry, locks on the physical game cabinet, and/or remote circuitry that transmits data to the gaming device.

The computing arrangement 200 may be connected to other computing devices or gaming machines, such as via a network. The computing arrangement 200 may be connected to a network server(s) 228 in an intranet or local network configuration. The computer may further be part of a larger network configuration as in a global area network (GAN) such as the Internet. In such a case, the computer may have access to one or more web servers via the Internet. In other arrangements, the computing arrangement 200 may be configured as an Internet server and software for carrying out the operations in accordance with the present invention may interact with the player via one or more networks. The computing arrangement 200 may also be operable over a social network or other network environment that may or may not regulate the wagering and/or gaming activity associated with gaming events played on the computing arrangement.

Other components directed to gaming machine implementations include manners of gaming participant payment, and gaming machine payout. For example, a gaming machine including the computing arrangement 200 may also include a payout controller 242 to receive a signal from the processor 202 or other processor(s) indicating a payout is to made to a player and controlling a payout device 244 to facilitate payment of the payout to the player. In some embodiments, the payout controller 242 may independently determine the amount of payout to be provided to the participant or player. In other embodiments, the payout controller 242 may be integrally implemented with the processor 202. The payout controller 242 may be a hopper controller, a print driver, credit-transmitting device, bill-dispensing controller, accounting software, or other controller device configured to verify and/or facilitate payment to a player.

A payout or payment device 244 may also be provided in gaming machine embodiments, where the payment device 244 serves as the mechanism providing the payout to the player or participant. In some embodiments, the payment device 244 may be a hopper, where the hopper serves as the mechanism holding the coins/tokens of the machine, and/or distributing the coins/tokens to the player in response to a signal from the payout controller 242. In other embodiments, the payout device 244 may be a printer mechanism structured to print credit-based tickets that may be redeemed by the player for cash, credit, or other casino value-based currency or asset. In yet other embodiments, the payout device 244 may send a signal via the network server 228 or other device to electronically provide a credit amount to an account associated with the player, such as a credit card account or player loyalty account. The computing arrangement 200 may also include accounting data stored in, for example, one of the memory devices 204, 206. This accounting data may be transmitted to a casino accounting network or other network to manage accounting statistics for the computing arrangement or to provide verification data for the currency or currency-based tickets distributed by the payout device, such as providing the data associated with the bar codes printed on the currency-based tickets so they are identifiable as valid tickets for a particular amount when the player redeems them or inserts them in another gaming device.

The wager input module or device 246 represents any mechanism for accepting coins, tokens, coupons, bills, electronic fund transfer (EFT), tickets, credit cards, smart cards, membership/loyalty cards, or any other player assets, for which a participant inputs a wager amount. The wager input device 246 may include magnetic strip readers, bar code scanners, light sensors, or other detection devices to identify and validate physical currency, currency-based tickets, cards with magnetized-strips, or other medium inputted into the wager input device. When a particular medium is received in the wager input device 246, a signal may be generated to establish or increase an available credit amount or balance stored in the internal memory/storage of the computing device 200, such as in the RAM 204. Thereafter, specific wagers placed on games may reduce the available credit amount, while awards won may increase the available credit amount. It will be appreciated that the primary gaming software 232 may be able to control payouts via the payment device 244 and payout controller 242 for independently determined payout events.

Among other functions, the computing arrangement 200 provides an interactive experience to players via an input interface 222 and output devices, such as the display 211, speaker 230, etc. These experiences are generally controlled by gaming software 232 that controls a primary gaming activity of the computing arrangement 200. The gaming software 232 may be temporarily loaded into RAM 204, and may be stored locally using any combination of ROM 206, drives 212, media player 214, or other computer-readable storage media known in the art. The primary gaming software 232 may also be accessed remotely, such as via the server 228 or the Internet.

The primary gaming software 232 in the computing arrangement 200 may be an application software module. According to embodiments of the present invention, this software 232 provides a slot game or similar game of chance as described herein. For example, the software 232 may present, by way of the display 211, representations of symbols to map or otherwise display as part of a slot based game having reels. However, in other embodiments, the principles of this concept may be applied to poker games or other types of games of chance. One or more aligned positions of these game elements may be evaluated to determine awards based on a pay table. The software 232 may include instructions to provide other functionality as known in the art or as described and shown herein.

The systems, apparatuses and methods operable via these and analogous computing and gaming devices can support gaming features as described herein. In one embodiment, cards or card positions are identified at a first time, and favorable or more favorable cards are forced, or at least offered, at those card positions at a second time. Some embodiments relate to identifying card positions, in hands of poker or other card games, that will be accorded some heightened value or enrichment on a future hand(s) of the game. Some representative gaming devices incorporating principles disclosed herein provide, among other things, game play that involves randomly or otherwise identifying game indicia positions in current gaming activities that will have their associated game indicia enriched or otherwise benefitted in one or more future gaming activities.

In one embodiment, the gaming activity comprises a poker game, and cards in a current poker hand(s) may be marked or otherwise designated at card positions, or alternatively a count of cards, that will be enhanced, enriched, or otherwise exhibit a higher payout potential and/or likelihood of achieving a winning result in a subsequent poker hand(s).

In one embodiment, one or more cards of a hand(s) in a single or multiple hand game may be randomly or systematically marked, and cards that are dealt to those marked positions in a subsequent hand(s) are benefitted or upgraded in some way, such as changing to a higher value, changing to a card more likely to result in a winning combination (e.g., wild card) and/or higher payout (e.g., multiplier or other payout modifier), etc.

In one embodiment, the number of cards positions (if any) that will be made available for subsequent card upgrades is provided in connection with a current poker game, and that number of cards (if any) will be upgraded or otherwise changed in a future poker game. In one embodiment, the card positions in the future poker game are selected randomly, in the quantity identified in the current poker game, to be upgraded. In another embodiment, the card positions in the future poker game are assigned according to rules, such as the quantity of cards to be upgraded starting from the leftmost position in the hand(s), or the rightmost position, etc.

Many embodiments may be described in terms of an electronic poker game, where presented cards potentially form a result(s) that conforms to a predetermined winning outcome to determine payout awards. However, the principles described herein are equally applicable to other games of chance, as described herein and as will be readily apparent to those skilled in the art from the teachings herein.

Figure 3A:
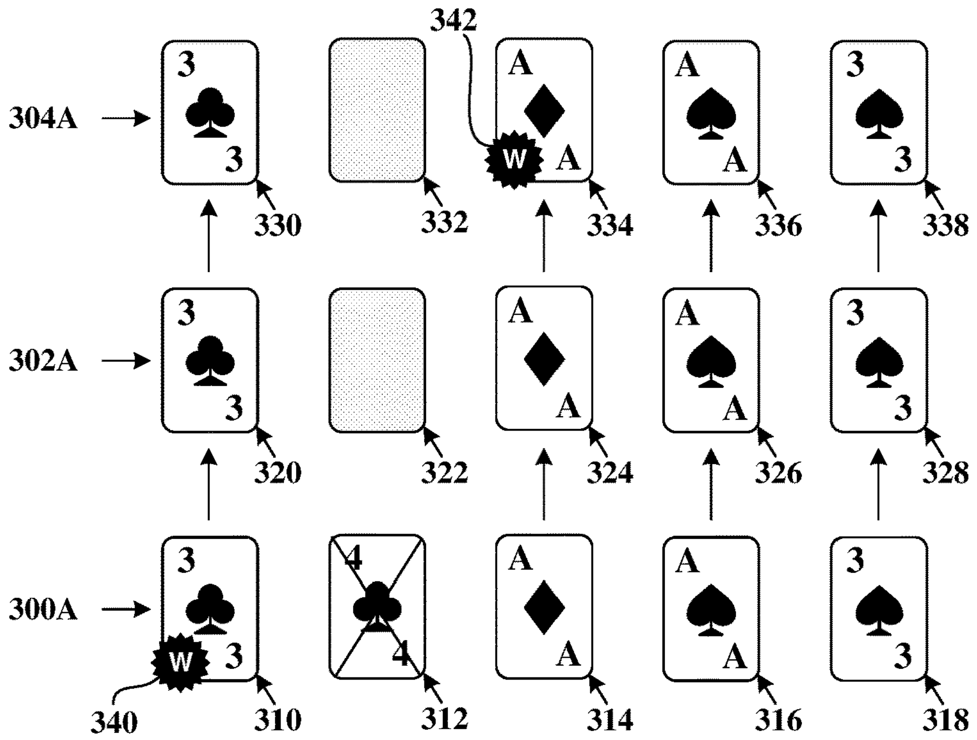
FIGS. 3A, 3B, 4A and 4B depict representative multi-play poker embodiments that identify card positions and/or card counts for card enrichment on a subsequent hand(s).
Figure 3B:
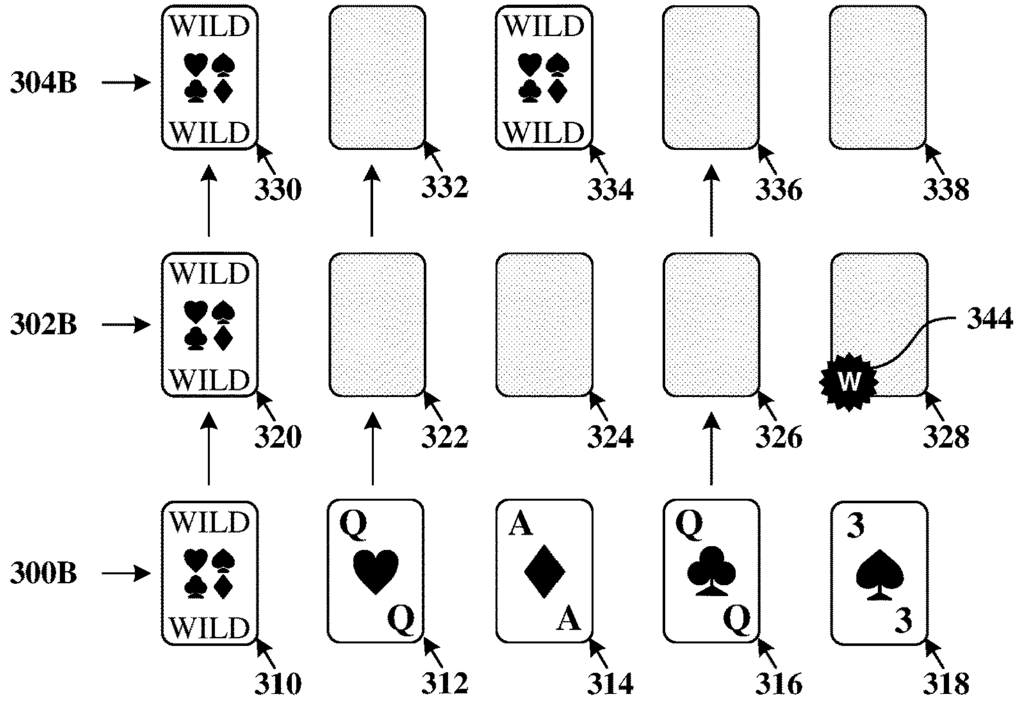

FIGS. 3A and 3B are described in the context of an electronic, multi-play, poker game embodiment. This embodiment depicts three concurrently-played hands 300A, 302A, 304A, although as few as one hand 300A could be played, and as many more than three hands 300A, 302A, 304A as desired.

FIG. 3A in this example represents a current poker game being played, that includes a first, original hand 300A, and one or more additional hands 302A, 304A. The first hand 300A is dealt, including cards 3-Clubs, 4-Clubs, Ace-Diamonds, Ace-Spades, and 3-Spades at card positions 310, 312, 314, 316 and 318 respectively. Hand 302A includes card positions 320, 322, 324, 326 and 328, while hand 304A includes card positions 330, 332, 334, 336 and 338. In accordance with one embodiment of multi-play draw poker, in which the present example assumes, cards held in one hand 300A are replicated into the other hands 302A, 304A. Other multi-play poker games may involve replicating cards into one or more other hands, but not all hands. For purposes of this example, it is assumed that cards held in the draw poker hand 300A are replicated into all of the other concurrently-played hands 302A, 304A.

In accordance with one embodiment, at any time during play of the multi-play poker event, one or more indications may be provided to designate a respective card position(s) for card enrichment, or at least potential card enrichment, on one or more subsequently played poker hands. For example, in connection with dealing the first hand 300A (whether before or after the card indicia is presented to the player), some indication, such as a sub-symbol 340, may be presented in connection with the hand 300A. This sub-symbol 340 or other indication identifies the card position 310 for card enrichment on a subsequent hand(s). Presentation of such a sub-symbol 340 or other indication might instead be presented in connection with other card positions of hand 300A, and/or in connection with other card positions of hand 302A and/or 304A.

In one embodiment, such sub-symbols or other indications may be provided in connection with one of the other hands 302A, 304A at the time the original hand 300A is dealt, or may be provided at a later time, such as if/when any cards are held from hand 300A into the hands 302A, 304A and/or if/when drawn cards replace discarded cards. In the representative example of FIG. 3A, another sub-symbol 342 was randomly provided at card location 334 of hand 304A. Thus, in a subsequent multi-play poker hand, the cards at both card positions 310 and 334 will be enhanced or otherwise provided with some benefit or potential benefit, such as being populated with a wild card, wild card with multiplier or other payout modifier (e.g., exponent, etc.), multiplier or other modifier, high value card (e.g., card rank "2" where four-of-a-kind in "2s" provides a higher payout than other card ranks), or the like.

In some embodiments, the enriched card is based on what cards are dealt in the subsequent hand(s). For example, if the subsequent hand is known to have dealt two Aces, an enriched card for that subsequent hand may be another Ace. If the subsequent hand is known to have dealt three of a particular suit, an enriched card for that subsequent hand may be another card of that suit. If the subsequent hand is known to have dealt a string of 3 or 4 consecutive cards by rank (e.g., 6, 7, 8), an enriched card for that subsequent hand may continue on that consecutive string. Thus, in some embodiments, the enriched cards in the subsequent hand are dependent on one or more, or even all, of the cards that are being dealt in the subsequent hand(s) in which the enriched cards are made available.

Providing such indications/sub-symbols 340, 342 may be provided entirely randomly. For example, card position indicators may be provided at any random time during play, whether in connection with the initial deal of the first hand 300A, and/or in connection with the initial deal of the other hands 302A, 304A of the multi-play poker game, and/or in connection with post-initial-deal activities such as in connection with a drawn card(s), etc. Alternatively, providing such indications/sub-symbols 340, 342 may be provided in connection with some event, such as a prior win, prior loss, minimum hand 300A poker rank (e.g., below some poker rank, above some poker rank, etc.), consecutive wins or losses, wager amount, or any other criteria desired to trigger the provision of one or more such sub-symbols 340, 342 or other indications. In such embodiments, the card position indicators may not be available to the player at any possible time, but rather may be provided randomly after some enabling/triggering event, such as the occurrence of some symbol(s), specific cards, a non-win on the initial deal, a non-win on drawn cards, a win on the initial deal, a win as a result of drawn cards, a number of wins in a row or within some range of hands, a number of losses in a row or within some range of hands, a time passage without a win, a sufficiently high wager, or the like. These representative examples show that the principles of identifying card positions, identifying a number of cards, identifying particular card values, or the like, may be made available always, or in a limited fashion based on time, events, etc.

The poker hands 300A, 302A, 304A of FIG. 3A may be played out to a conclusion. For example, the player chose to hold cards at card positions 310, 314, 316 and 318, resulting in those cards being replicated into hand 302A at card positions 320, 324, 326 and 328 respectively, and into hand 304A at card positions 330, 334, 336 and 338 respectively. The player chose to discard the card at card position 312 of hand 300A, and therefore replacement cards will be provided at card locations 312, 322 and 332 of hands 300A, 302A and 304A respectively.

Then, on a subsequently-played hand depicted in FIG. 3B (e.g., the next hand, or the Nth hand to follow, or the next N hands, or a random later hand, etc.), those card positions 310, 334 identified in the earlier poker play of FIG. 3A are provided with some benefit. In the illustrated embodiment of FIG. 3B, the benefit provided is a wild card. Thus, at card position 310 of hand 300B and card position 334 of hand 304B, a wild card is provided. This increases the chances of getting a winning payout and/or a higher payout amount, since the wild card represents a plurality of cards and provides multiple options for hand results. The held cards of hand 300A could be replicated into any positions of the other hands 302A, 304A.

Since the present example is described in a multi-play draw poker context (a triple-play context in this example, where three hands are played), holding a card(s) in one hand 300B causes that card(s) to be replicated and held in other hands 302B, 304B. Since a wild card has now been provided at card position 310, it is replicated into like card positions 320, 330 (but could be any positions) of the other hands 302B, 304B. In this example, the player has also chosen to hold cards at card positions 312 and 316, which would also be respectively replicated into card positions 322 and 326 of hand 302B, and respectively replicated in the card positions 332 and 336 of hand 304B (not shown).

In the illustrated embodiment, a wild card is also provided at card position 334 of hand 304B, as a result of the sub-symbol 342 (or other indication) at the card position 334 of the prior hand shown in FIG. 3A. In one embodiment, had the player held the card at card position 314, the wild card (or other enriched card) at card position 334 would be replaced by the held card from card position 314. In another embodiment, even if the player held the card at card position 314, the wild card (or other enriched card) at card position 334 would remain a wild card (or other enriched card). In still other embodiments, the better of the held card and the enriched card may be used at such position 334. In still other embodiments, still other criteria may be used to determine whether an enriched card or a newly drawn card will be used, such as using both/all enriched and newly drawn cards in separate outcomes, randomly selecting between the enriched and newly drawn cards, using the enriched or newly drawn card(s) that provides the lowest payout, using the enriched or newly drawn card(s) that provides the highest payout, using a new card based on both the enriched and newly drawn cards (e.g. if the enriched card was a "wild suit" card providing the replicated card in any suit, then the new card based on both the enriched and newly drawn cards may be the replicated card in any card suit, such as the card suit that provides or potentially provides the highest payout), etc. It should be recognized that still further examples exist of managing an enriched card on a subsequent hand that is also subject to a card replication in a multi-play poker environment, all of which may be implemented in connection with the disclosure herein to provide a desired outcome.

During this subsequent poker hand of FIG. 3B, still other sub-symbols 344 may again be presented in connection with any one or more of the card positions of any of the hands 300B, 302B, 304B, for the benefit of subsequent hands. In other embodiments, other sub-symbols such as sub-symbol 344 are not active after the initial deal, or after a card position(s) has already been identified, etc.

In one embodiment, the enriched cards may be used for more than one hand, and may be used for some number of consecutive subsequent hands, some number of nonconsecutive subsequent hands, some number of subsequent hands until some termination event occurs, etc.

In one embodiment, the sub-symbol 340, sub-symbol 342, and/or any other indication identifying respective card positions may be used to provide card enrichment with the current poker game shown in FIG. 3A. Enriching cards in a hand(s) in identified card positions of the current poker game may be done in lieu of enriching cards in a hand(s) of a subsequent poker game(s), or may be done in addition to enriching cards in a hand(s) of a subsequent poker game(s). For example, at any time during play of a current multi-play poker event as depicted in FIG. 3A, one or more indications (e.g. sub-symbols 340, 342 or other manner of identifying a card position(s)) may be provided to designate a respective card position(s) for card enrichment, or at least potential card enrichment, on one or more currently played poker hands 300A, 302A, 304A. The sub-symbol or other indication identifies the card position for card enrichment on the current hand(s). For example, sub-symbol 340 may mark card position 310 to replace the dealt 3 of Clubs with an enriched card, such as a Wild card. In such an embodiment, the current hand would benefit from the random occurrence(s) of an indication of one or more card positions to be enhanced.

In another embodiment, the card enrichment features may be used on both the current poker event and a subsequent poker event(s). For example, the sub-symbol 340, sub-symbol 342, and/or any other indication identifying respective card positions may be used to provide card enrichment with both the current poker game shown in FIG. 3A and the subsequent poker game shown in FIG. 3B. For example, at any time during play of a current multi-play poker event as depicted in FIG. 3A, one or more indications (e.g. sub-symbols 340, 342 or other manner of identifying a card position(s)) may be provided to designate a respective card position(s) for card enrichment, or at least potential card enrichment, on one or more currently played poker hands 300A, 302A, 304A of FIG. 3A, which will then also carry over to a subsequent poker game(s) such as one or more subsequently played poker hands 300B, 302B, 304B of FIG. 3B.

The sub-symbol or other indication may identify the card position(s) for card enrichment on the current hand(s), and on the subsequent hand(s). In another embodiment, the card position identified for enhancement may change from the current hand(s) to the subsequent hand(s), such as randomly changing the card positions that are enhanced in the subsequent hand(s) relative to the current hand(s), or moving the card positions that are enhanced in the subsequent hand(s) in a patterned or systematic way relative to the current hand(s)

(e.g. relative to the identified card position in the current hand(s), the card position in the subsequent hand(s) moves one position to the left or right, or moves up or down to a different one of the concurrently-played hands, etc.), or the like. In another embodiment, the number of card positions to obtain enhanced cards may be changed from the currently-played hand(s) (where the enhancements may be awarded) to the subsequently-played hand(s). For example, when one card position is identified in (and an enhanced card(s) used to benefit) the currently-played poker game (e.g. FIG. 3A), two or more card positions may be identified in (and enhanced cards used to benefit) the subsequently-played poker game (e.g. FIG. 3B). This increase (or in other embodiments decrease) in card positions from a current hand to a subsequent hand may be random, based on a fixed rule (e.g. double the number of card positions of the current hand, or halve the number of card positions of the current hand, etc.), may be based on wager amount (e.g. betting one credit gets a 1:1 current-to-subsequent card position enhancement; betting two credits gets a 2:1 current-to-subsequent card position enhancement; betting three credits gets a 3:1 current-to-subsequent card position enhancement; etc.), or the like.

Thus, descriptions herein relating to benefitting a subsequent hand(s) are also applicable to embodiments where the poker game/hand in which the benefit originates (e.g. where the indication 340, 342 or other indication occurs) obtains the benefit of the enriched card(s) in addition to the subsequent hand(s) that receive the benefit. Additionally, descriptions herein relating to benefitting a subsequent hand(s) are also applicable to embodiments where the poker game/hand in which the benefit originates (e.g. where the indication 340, 342 or other indication occurs) obtains the benefit of the enriched card(s) instead of the subsequent hand(s) receiving the benefit.

In one embodiment, an additional wager or increased cost to play may be involved to qualify the player to partake in the subsequent hand benefit features described herein.

Thus, in one embodiment associated with the example of FIGS. 3A and 3B, a multi-hand poker format is implemented, where the player may make a wager for each of the concurrent hands being played and makes a wager to enable the subsequent hand card enrichment feature described herein. Sub-symbols or other indicators can be used to indicate that on the next hand (or other subsequent hand(s)) those corresponding card positions will be awarded a wild card, wild card with multiplier or other modifier, multiplier or other modifier, etc. In one embodiment, every card has a chance of obtaining a sub-symbol, and sub-symbols can be dependent on cards, could be independent and just based on card location, etc.

Figure 4A:
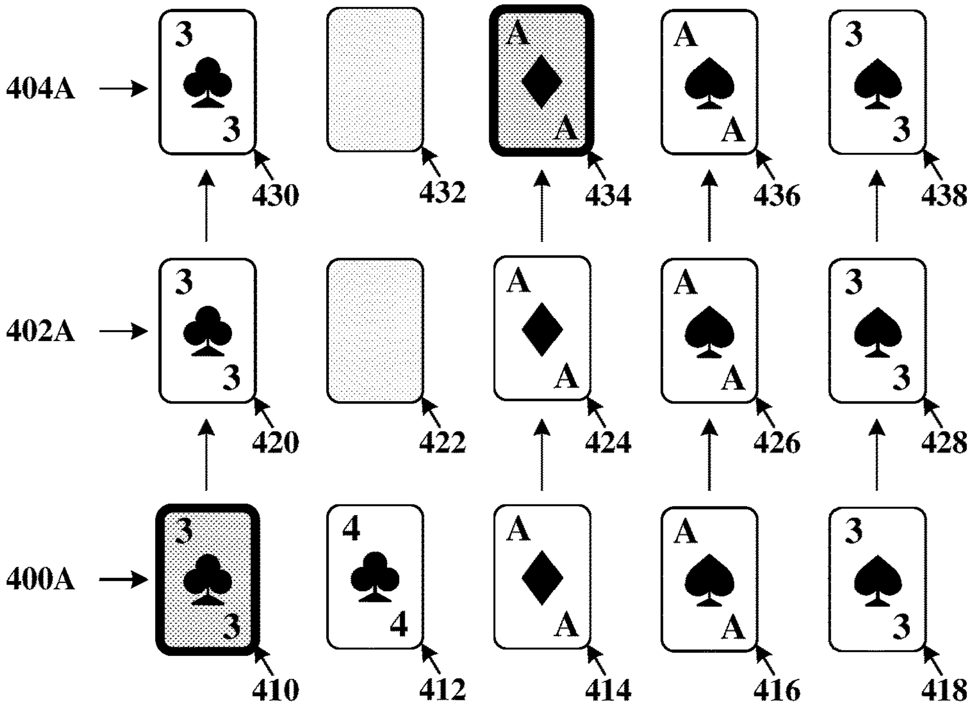
Figure 4B:
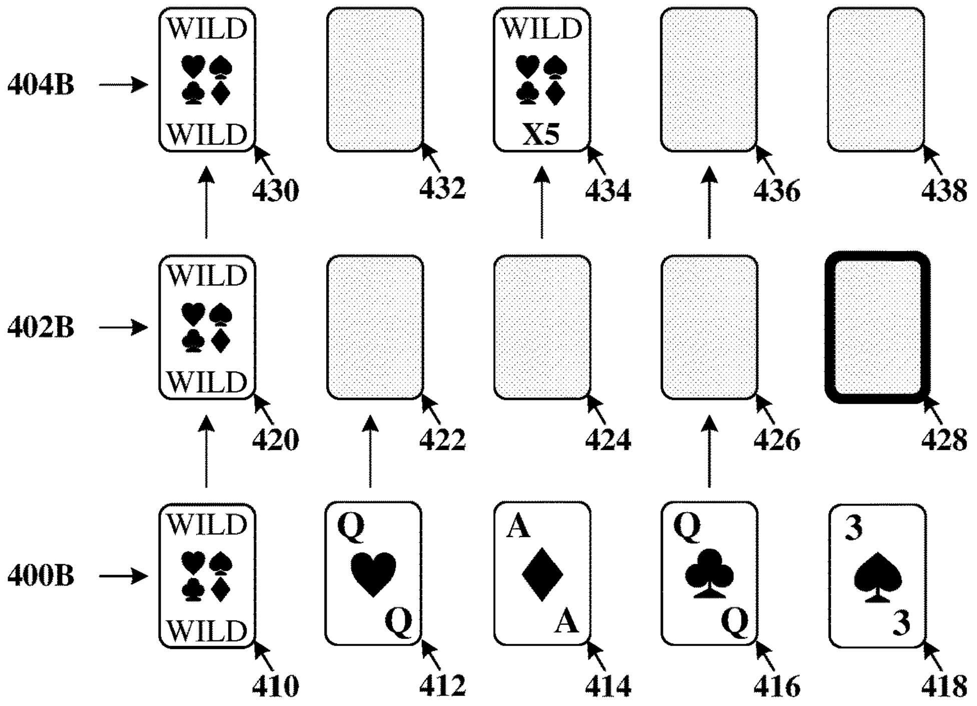

As noted herein, any type of indication(s) may be used to identify cards and/or card positions. FIGS. 4A and 4B depict another representative example of an electronic, multi-play, poker game embodiment. FIG. 4A in this example represents a current poker game being played, that includes a first, original hand 400A, and one or more additional hands 402A, 404A. The first hand 400A is dealt, including cards 3-Clubs, 4-Clubs, Ace-Diamonds, Ace-Spades, and 3-Spades at card positions 410, 412, 414, 416 and 418 respectively. Hand 402A includes card positions 420, 422, 424, 426 and 428, while hand 404A includes card positions 430, 432, 434, 436 and 438. In accordance with one embodiment of multi-play draw poker, in which the present example assumes, cards held in one hand 400A are replicated into the other hands 402A, 404A.

In accordance with one embodiment, at any time during play of the multi-play poker event, one or more indications may be provided to designate that respective card position(s) for card enrichment, or at least potential card enrichment, on one or more subsequent played poker hands, as was described in the embodiment of FIGS. 3A/3B. The example of FIGS. 4A and 4B illustrates another representative manner in which cards and/or card positions may be designated for card enrichment on a subsequent hand(s). In the example of FIGS. 4A and 4B, card positions are highlighted or otherwise emphasized to identify the card positions for subsequent card enrichment. For example, card position 410 of hand 400A and card position 434 of hand 404A are visually distinguished from other cards, to notify the player that those corresponding card positions will be allowed to receive enriched cards in a subsequent hand(s). The hands 400A, 402A, 404A may then be played out to their conclusions.

Then, on a subsequently-played hand depicted in FIG. 4B, those card positions 410, 434 identified in the earlier poker play of FIG. 4A are provided with some benefit, which are wild cards and/or wild cards with multipliers in the present example. Thus, at card position 410 of hand 400B and card position 434 of hand 404B, a wild card is provided, and the wild card at card position 434 further includes a multiplier (5× multiplier in this example). Thus, hand 404B may provide a higher likelihood of winning since wild cards are present at card locations 430 and 434, and a 5× multiplier would be applied to any resulting payout due to the wild-5× enrichment card at card location 434. Cards may be held, such as cards at card positions 410, 412 and 416, to be replicated into corresponding card positions 420, 430, 422, 432, 426, 436 of hands 402B, 404B. In other embodiments, the held cards of hand 400A could be replicated into any positions of the other hands 402A, 404A and need not be "corresponding" positions in the hands.

During this subsequent poker hand of FIG. 4B, still other card or card positions 428 may again be highlighted or otherwise emphasized to identify that new card position for card enrichment on a subsequent hand(s).

Thus, in one embodiment associated with the example of FIGS. 4A and 4B, a multi-hand poker format is implemented, where the player may make a wager for each of the concurrent hands being played and makes a wager to enable the subsequent hand card enrichment feature described herein. Mystery triggers or other random occurrences, manifested as card or card position highlighting/emphasis, can identify card positions available for card enrichment on the next hand (or other subsequent hand(s)). In one embodiment, the card locations may be highlighted at least visually, such as providing a green glow for those card locations identified for subsequent card enrichment. In one embodiment, every card/card position has a chance of being highlighted, where in other embodiments such chances are limited to some subset (e.g., the first hand 400A, etc.), whether fixed to some subset, dependent on cards played, etc.

In one embodiment, identified cards/card positions are enabled for subsequent card enrichment if the current hand includes an additional wager(s) to enable such features. In another embodiment, identified cards/card positions are enabled for subsequent card enrichment if the subsequent hand includes an additional wager(s) to enable such features. In still another embodiment, identified cards/card positions are enabled for subsequent card enrichment if both the current and subsequent hand include additional wagers to enable such features. In still other embodiments, no additional wagers are involved, and any cost is included in the standard wager to play in the game. In still other embodiments, no additional wagers are involved, but a threshold wager enables the subsequent hand card enrichment features, such as placement of a maximum wager where multiple available wager amounts are available. The principles described herein may be implemented regardless of the manner of enabling the feature, and/or where the feature is always enabled, or enabled randomly, or enabled in other desired manners.

Figure 5A:
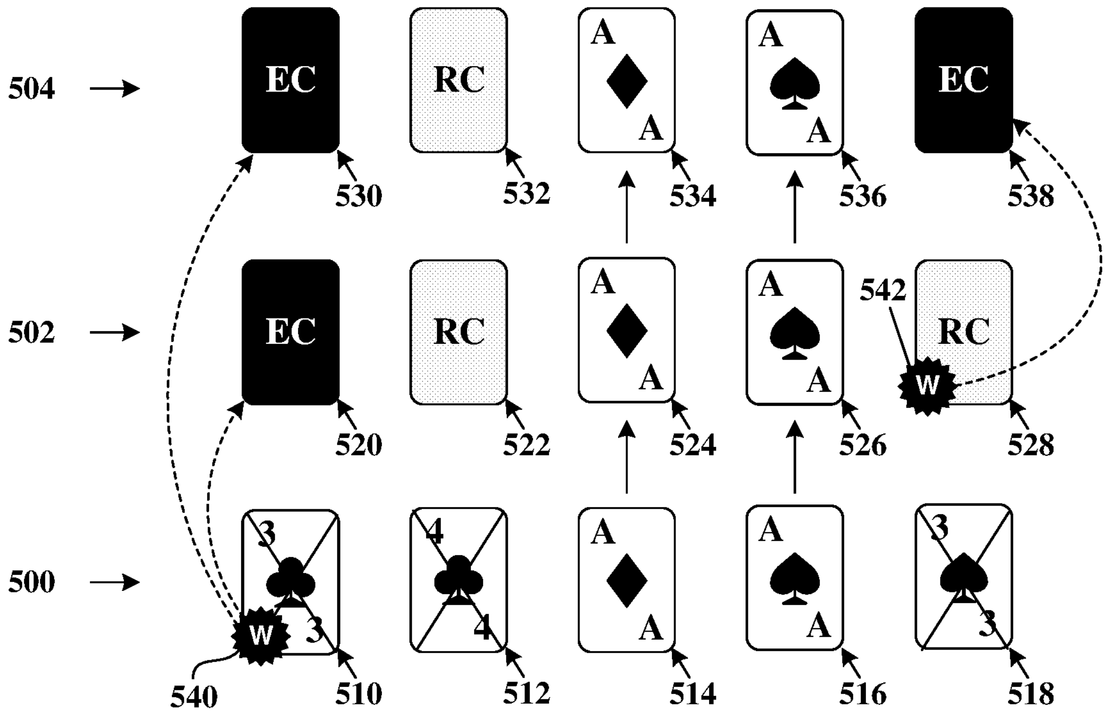
FIGS. 5A and 5B depict a representative example of a multi-play poker embodiment that enables card enrichment within the hands of the multi-play poker game or other poker/card game involving playing multiple hands.

In one embodiment, the enhancement may be provided within the multiple hands of a multi-play poker game, rather than, or in addition to, the enhancement being provided on a subsequent hand(s). FIG. 5A depicts a representative example of a multi-play poker embodiment that enables card enrichment within the hands of the multi-play poker game or other poker/card game involving playing multiple hands. In this embodiment, card positions that are marked (e.g. randomly, periodically, scheduled, etc.) will identify corresponding card positions in other hands of the multi-play poker game in which to provide enriched cards.

This example assumes a five-card multi-play draw poker game, which is a three-hand draw poker game (e.g. triple play poker) in this embodiment. However, the description herein is equally applicable to other poker variations such as multiple hand stud poker, etc. A first hand 500 is dealt, which in this example includes five cards, including the 3-Clubs, 4-Clubs, Ace-Diamonds, Ace-Spades, and 3-Spades at respective card positions 510, 512, 514, 516, 518. Card "positions" or "locations" in this disclosure does not imply a particular positioning, but rather merely references whatever position the cards are dealt to. In one embodiment, other hands 502, 504 of the multi-play poker game begin with card positions in which cards may be held into from the first hand 500, with remaining cards being filled with replacement cards (although other embodiments may involve dealing cards to the card positions of hands 502, 504). "Hand" 502 therefore may begin with card positions 520, 522, 524, 526 and 528, while a third hand 504 includes card positions 530, 532, 534, 536 and 538. In one embodiment, cards held in the first hand 500 are replicated into corresponding card positions of both (or in other embodiments at least one) other hands 502, 504.

In the embodiment of FIG. 5A, the player has received a card enrichment indicator 540 in connection with card position 510 of hand 500. In one embodiment, the cards of the next hands, namely card positions 520, 530 of hands 502, 504, will receive enriched cards (EC). In one embodiment, the card at card position 510, where the indicator 540 occurred, will also receive an enriched card. In other embodiments, the player retains the card dealt to card position 510 where the indicator 540 occurred, while the corresponding card positions 520, 530 of the respective next hands 502, 504 are targeted for the enriched cards. In one embodiment where the player retains (i.e. does not discard) the card dealt to the card position (e.g. card position 510) where the indicator 540 occurred, the player's held card is replicated into corresponding card positions 520, 530 of respective hands 502, 504, thereby overriding the use of enriched cards at the corresponding card positions 520, 530. However, in other embodiments, such as that described hereinafter for the example of FIG. 5A, it is assumed that the card at the card position 510 where the indicator 540 occurred is played independently of the targeted enriched cards (EC) at corresponding card positions 520, 530. Thus, while in this example the player has decided to discard the cards at card positions 510, 512 and 518 to obtain replacement cards from the sourcing card deck(s), the cards that will be provided at the card positions 520, 530 corresponding to the card position 510 where the indicator 540 occurred will receive enriched cards (EC).

For the other card positions where the player did not hold the dealt card (e.g. the 4-Clubs and 3-Spades at card positions 512, 518 respectively), and where no indicator (e.g. 540) is associated therewith, replacement cards will be provided to each card position from the sourcing deck(s). For example, by discarding the 4-Clubs at card position 512, new cards will be dealt to card positions 512, 522, 532, and by discarding the 3-Spades at card position 518, new cards will be dealt to card positions 518, 528, 538, as indicated by the "x-out" on cards at card positions 512, 518, and the "RC" (replacement card) at card positions 522, 532, and 528. The cards held at card positions 514, 516 are replicated into corresponding card positions of the other hands 502, 504, such that the Ace-Diamonds from card position 514 is replicated into corresponding card positions 524, 534 of hands 502, 504 respectively, and the Ace-Spades from card position 516 is replicated into corresponding card positions 526, 536 of hands 502, 504 respectively.

In one embodiment, any number of card enrichment indicators may be presented, randomly, systematically, or otherwise. Thus, in one embodiment, another card enrichment indicator 542 may be presented at any time during play, such as in connection with the initial deal, after cards have been held in a hand (e.g. hand 500), in connection with drawn cards, or any other time. In one embodiment, an indicator associated with a hand will enable a subset of the hands to be available for card enrichment, such as hands "after" the hand in which the indicator is presented. Thus, in one embodiment, the indicator 542 at card position 528 of hand 502 will allow the "next" hand (hand 504 in this example) to have its corresponding card position 538 enhanced, as depicted by the enhanced card (EC) at card position 538. In this manner, even where a card is held or subject to replacement due to a discarded card in the first hand 500, an enriched card(s) can impact at least one more hand. In yet another embodiment, the card enrichment can "wrap around," such that a card enrichment indicator 542 at card position 528 of the $2^{nd}$ hand 502 would cause card position 538 of hand 504 to be enriched, and wrap around to cause card position 518 of hand 500 to be enriched, or provide the possibility or option to be enriched.

Figure 5B:
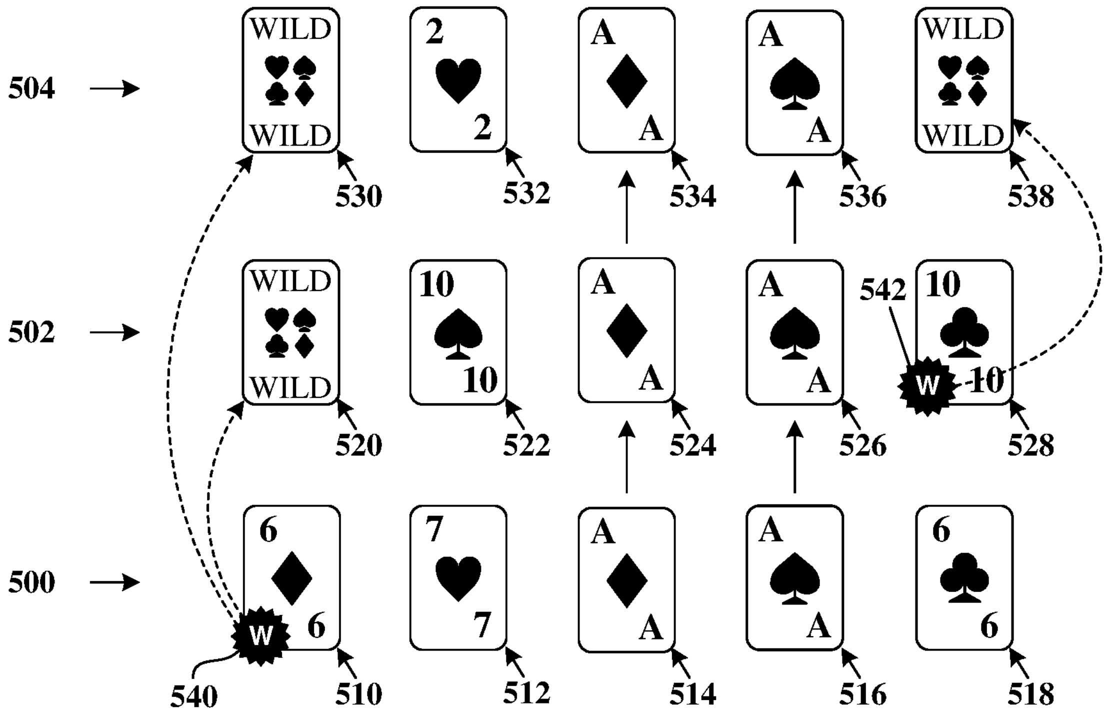

Using the same reference number as in FIG. 5A, FIG. 5B depicts an example of resulting final hands in which payouts may be determined. In the example of FIG. 5B, card positions identified for enriched cards (EC) in FIG. 5A are changed to wild cards, card positions available to receive replacement cards (RC) are provided with new replacement cards (e.g. from the virtual/electronic sourcing decks or elsewhere), cards from card positions 510, 512 and 518 which are discarded are also provided with new replacement cards, and held cards from card positions 514, 516 are replicated into corresponding card positions of the remaining hands 502, 504. Thus, in the example of FIG. 5B showing final hands for the hands presented in FIG. 5A, the player obtains two pair (Sixes and Aces) for hand 500, a full house (three Aces and two Tens, with the Wild card serving as one of the Aces) for hand 502, and four-of-a-kind (four Aces, with two Wild cards serving as two of the Aces) for hand 504. In one embodiment, those cards marked with card enrichment indicators may also mark card positions for one or more subsequent multi-play poker hands to enable further card enrichment.

Figure 6:
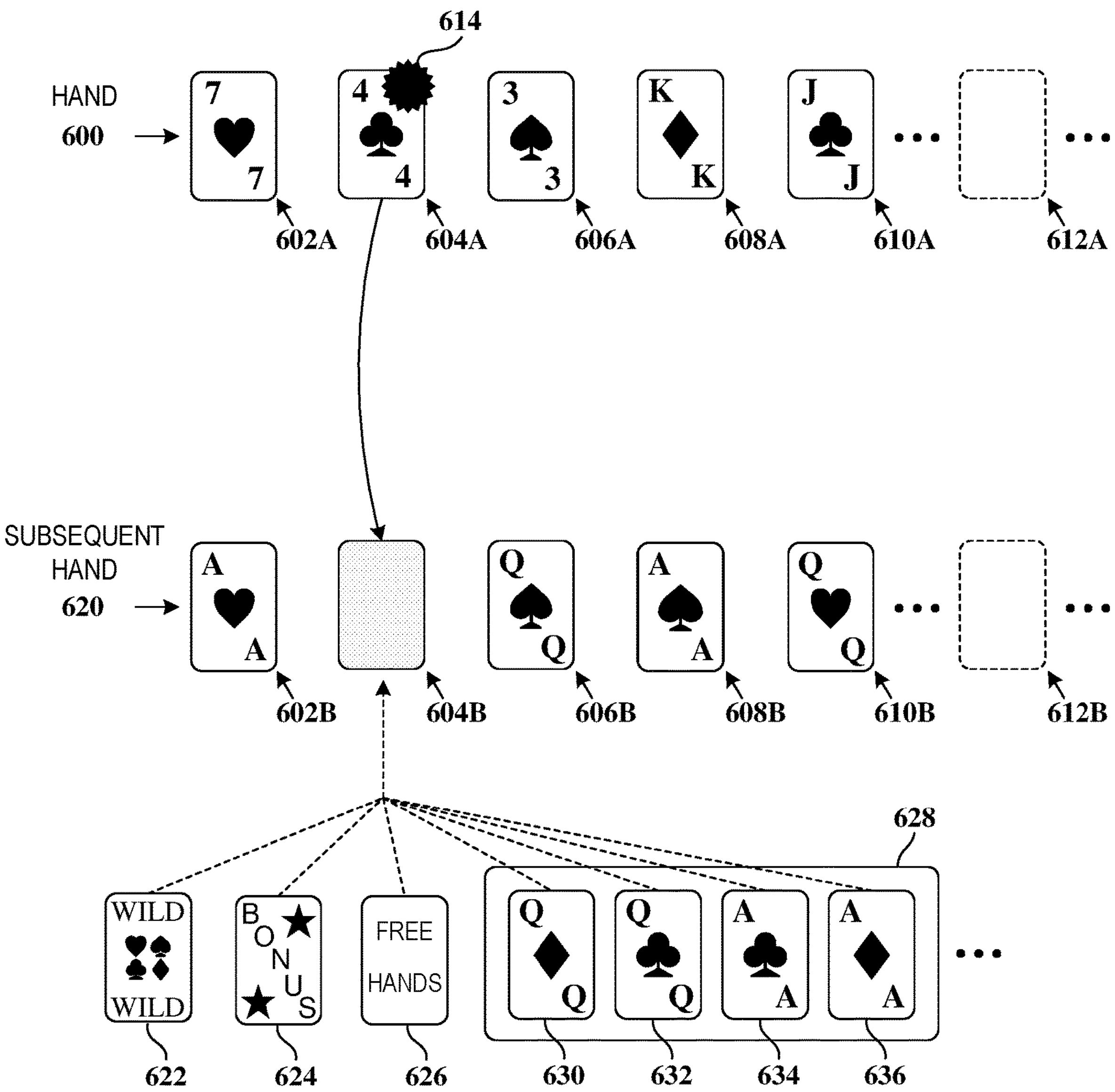
FIG. 6 depicts a representative single-play poker embodiment that identifies card positions and/or card counts for card enrichment in a subsequent poker hand(s).

FIG. 6 depicts a representative single-play poker embodiment that identifies card positions and/or card counts for card enrichment in a subsequent poker hand(s). As noted previously, the principles described herein are applicable in single-play games or multi-play games, such as single-hand poker or multi-hand poker, etc. The example of FIG. 6 depicts a single-hand poker game, which may be a single-hand stud poker, draw poker, or other poker game.

A first hand 600 may represent any dealt poker hand, such as a hand in stud poker, an initial hand in draw poker, or the like. In the example of FIG. 6, sub-symbols identify the card positions for subsequent card enrichment, although any manner of identifying card positions may be employed. In this example, a hand of five cards is dealt to card positions 602A, 604A, 606A, 608A, 610A. In games where there are fewer than five cards, then one or more of the card positions 602A, 604A, 606A, 608A, 610A would not be dealt to. In games where there are more than five cards, then one or more additional cards may be dealt to respective card positions 612A. In the present example, the poker game involves an initial deal of five cards, including the 7-Hearts, 4-Clubs, 3-Spades, King-Diamonds, and Jack-Clubs at card positions 602A, 604A, 606A, 608A, 610A respectively.

In the illustrated embodiment, an indicator 614, depicted as a sub-symbol, overlay, and/or other perceivable designation, is randomly positioned to identify card position 604A as a designated card position for subsequent hand enrichment. Different or additional card positions 602A, 606A, 608A, 610A, etc. may have alternatively and/or additionally been identified, and in still other hands no such card positions may be identified. In the illustrated embodiment, card position 604A is identified via sub-symbol 614, thereby notifying the player that the corresponding card position will be allowed to receive an enriched cards in a subsequent hand(s). The hand 600 may then be played out to its conclusion.

On a subsequently dealt hand 620, such as the hand immediately subsequent to played hand 600 in one example, the card position 604B is reserved for an enriched card based on the earlier hand 600 obtaining the indicator 614 at the corresponding card position 604A. As indicated elsewhere herein, the enhanced card that will occupy the identified card position 604B may be any card that can enhance the resulting hand 620. In one embodiment, such enhanced card provided to the enhanced card position 604B is designed to give the resulting hand 620 a higher probability of obtaining a winning result and/or a higher probability of getting a greater payout than if a card was randomly selected from the sourcing deck(s) of cards. Such enhanced cards may be any of, by way of example and not of limitation, a wild card 622 (which may or may not include additional enhancements, e.g. multipliers or other payout modifiers), bonus card 624 (e.g. a card that enables reaching a bonus event, or directly provides a credit or other award bonus, etc.), a free hands card 626 providing the player with one or more hands to play without providing additional player assets or providing less player assets, and/or other card that may prove beneficial to the play of the subsequent hand 620.

In one embodiment, the enhanced card is dependent on the state of one, more, or all of the other cards dealt to the subsequent hand 620. Such a situation-dependent card may be a particular card, or may be selected from a pool 628 of cards, that has a particular ability to help the subsequent hand 620 obtain a winning result and/or a higher payout. In the example of FIG. 6, the subsequent hand 620 includes an Ace-Hearts, Queen-Spades, Ace-Spades, and a Queen-Hearts at card positions 602B, 606B, 608B and 610B respectively. In this representative embodiment, another Queen or another Ace would allow the subsequent hand 620 to obtain a full house, which is the highest resulting subsequent hand 620 possible in view of the dealt cards at card positions 602B, 606B, 608B and 610B. In this embodiment, any of the Queen-Diamonds 630, Queen-Clubs 632, Ace-Clubs 634 and Ace-Diamonds 636 of the card pool 628 will cause the subsequent hand 620 to obtain a full house.

In one embodiment, the cards available in the card pool 628 may provide one or more "good" cards, the "best" card, multiple "best" cards, etc. For example, a "good" card might be one that provides a winning result, but not the best possible result (e.g. a card that completes a flush, but not a straight flush). Thus, the enhanced card may be randomly selected among one or more such "good" cards and provided to the player, or may select the best card of those randomly made available, or the player may be allowed to select from a plurality of cards that will provide a winning result, etc. As another example, the "best" card may be used to enhance the card position 604B, such as a wild card 622 that represents any card, or a special card that provides a jackpot, etc. Thus, it should be recognized that the description herein contemplates embodiments such as the enriched cards being the best card(s) possible, a good card(s) but not necessarily the best card(s) possible, a specialty card(s) such as a wild card 622, bonus card 624, free hands card 626 and/or other card to ensure or at least increase the probability of a win and/or higher payout, and/or any other desired card to enrich or potentially enrich the player's subsequent hand(s) 620.

As noted herein, the principles described herein are applicable to any poker game, as well as other card games, and other gaming activities. In the poker context, the example of FIG. 6 (and other poker embodiments) may involve stud poker that does not involve discarding and drawing replacement cards, may involve draw poker with does involve discarding and drawing replacement cards, hold'em poker where initial "hole" cards and/or community cards are subject to the subsequent hand enhancement, 3 Way Action® poker (using both stud and draw poker portions), and other poker variations. For example, in the example of FIG. 6, a five-card stud poker embodiment may involve dealing five cards to the hand 600 depicted at card positions 602A, 604A, 606A, 608A, 610A, where an indicator 614 indicates that a card at card position 604B of a subsequent hand 620 is available for enhancement.

A seven-card stud poker embodiment may involve dealing seven cards to the hand 600 depicted at card positions 602A, 604A, 606A, 608A, 610A through a seventh card position depicted by card position 612A, where an indicator 614 indicates that a card at card position 604B of a subsequent hand 620 is available for enhancement. In one seven-card stud poker embodiment, the best five of seven cards are used in the final resulting hand, where one embodiment involves allowing the identified card position (e.g. card position 604A identified by sub-symbol 614) of the hand 600 to be available for enhancement in the subsequent hand 620 regardless of whether the card at the identified card position is used in the first hand 600. Another seven-card stud poker embodiment involves allowing the identified card position (e.g. card position 604A identified by sub-symbol 614) of the hand 600 to be available for enhancement in the subsequent hand 620 only if the card at the identified card position is used in the first hand 600.

A draw poker embodiment may involve allowing the player to discard a number of cards of the hand 600, and obtain replacement cards. In one embodiment, the indicator(s) 614 may appear before the initial deal, in connection with the initial deal, in connection with discarding cards, in connection with obtaining replacement cards, etc. In one embodiment, regardless of when the indicator(s) 614 is provided, a corresponding card position in the subsequent hand 620 is identified for card enhancement. In one embodiment, the subsequent hand 620 may allow enhanced cards to be discarded and replaced by the player in a draw poker embodiment. In another embodiment, the subsequent hand 620 uses an enhanced card and does not afford the player an opportunity to discard and replace the enhanced card.

In other embodiments, an enhanced card (e.g. 622, 624, 626, 628) may additionally (or instead) be provided in the hand 600 in which the benefit originated. For example, in one embodiment, the indicator 614 designates card position 604A of a current hand 600 to receive an enhanced card, and designates a corresponding card position 604B of a subsequent hand 620 to receive an enhanced card, which may be the same or different enhanced card between the identified card positions of the hands 600, 620.

It should be recognized that by enhancing a "card position," the exact position of the card need not correspond. Rather, by "card position" it is meant that a card in the first of five card positions (for example) in one hand would correspond to a card in the first of five card positions in a subsequent hand, and the particular placement or whereabouts may be irrelevant. Further, while some embodiments correlate the particular card position from a first hand to a subsequent hand, the card position (e.g. which card position of those dealt) need not be the same in other embodiments. For example, if a card position is marked for enhancement in a first hand, a different card position may be the one enhanced in the subsequent hand. Thus, descriptions relating to utilizing a corresponding card position from one hand to a subsequent hand are equally applicable to enhancing any card(s) of the subsequent hand if the earlier hand indicated that the number of cards is to be enhanced. In such embodiments, card positions themselves would not need to be marked (although could be), but a number of cards to be enhanced in a subsequent hand may be randomly indicated in the earlier hand in any manner, including simply indicating a number (e.g. two) of cards to be enhanced in the subsequent hand.

Figure 7:
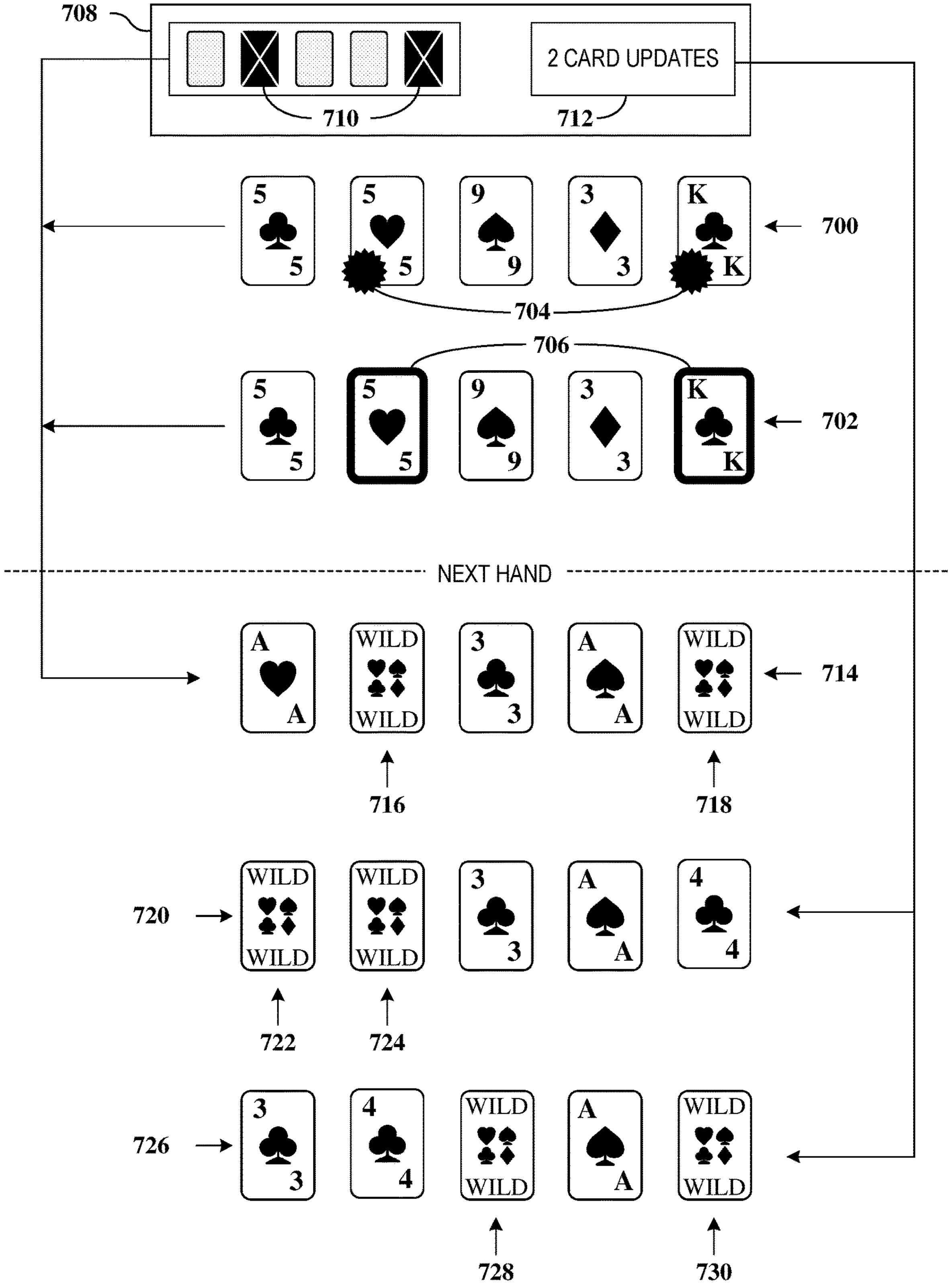
FIG. 7 illustrates representative examples in which card positions may be identified for card enrichment on subsequent hands.

As previously noted, card positions where enriched cards are provided in subsequent hands may correspond to the card positions of the current hand in which the card enrichment feature was awarded. In still other embodiments, particular card positions need not be carried over to the subsequent hands. FIG. 7 illustrates representative examples in which card positions may be identified for card enrichment on subsequent hands.

Poker hands 700 and 702 represent current hands using sub-symbols 704 and highlighting 706 respectively, as described in connection with FIGS. 3A/3B and 4A/4B respectively. The sub-symbols 704, highlights 706, and/or any other identifying indicia or distinctions, may be randomly presented at random times and associated with random card positions.

In another embodiment, a display 708 may present card locations for one or more hands 700, 702, depicting card locations 710 in which the card enrichment on subsequent hands may be provided.

For embodiments such as the use of sub-symbols 704, highlighting 706, depicted card locations 710, or other position-identifying implementations (including approximate position designations versus specific position designations), cards in a subsequent hand (the next hand 714 in this example) will be enriched or otherwise modified at the designated card positions 716, 718, as shown at next hand 714.

Some embodiments involve identifying approximate positions in which the card enrichments will occur, rather than specific card positions. For example, a designation may indicate to enrich any card in the original/first hand, or in the second hand, or any of the first three cards in any of the hands, etc.

As poker hands may not be card-order-dependent, other embodiments do not necessarily identify specific card positions, but rather identify a quantity of cards subject to card enrichment on a subsequent hand(s). For example, the display 708 may identify some number of card updates 712 that will be available for card enrichment on a subsequent hand. In the illustrated embodiment of FIG. 7, the display 708 presents card updates 712 indicating that two cards should be enriched on the next hand. For such embodiments, the cards to be updated may be determined by rules, may be determined randomly, may be selected by the player, etc. The next hand 720 shows the first two cards 722, 724 as the designated card enrichment positions, which in the illustrated embodiment may be identified by rule, such as to enrich cards in the quantity identified from left to right.

Another representative next hand 726 illustrates an example where card positions 728, 730 are designated randomly. In another embodiment, the player may select which card position should have the card enrichment.

As noted above, activity outside of the card play area may also cause the card enrichment feature to trigger, versus, for example, a random trigger. Another example is that a pair of dice or a die is rolled, and the number shown is the number of locations awarded for card enrichment. Alternatively, a wheel could be spun which determines the number and/or locations of card enrichment for a future game(s). These and other manners of determining which of the card positions are to house the enriched cards may be implemented.

In another embodiment, rather than card positions being identified, cards having certain characteristics (e.g., an 8 of Hearts) may identify its card position as one for card enrichment on a subsequent hand(s). For example, cards having a certain suit and/or rank may trigger the card enrichment feature. As a more particular example, it could be defined that when an "8" card is presented during play, that card position is marked for card enrichment on a future hand. In another particular embodiment, an 8 of Hearts or other particular card may serve as the trigger, whereby a maximum of one card enrichment for a subsequent hand could be awarded in a single-deck poker variant.

Cards can be enriched in any desired manner. Wild cards provide an enrichment, as the card may be defined to represent any card of the virtual deck (e.g. the electronically stored source of cards for the poker games), or at least any remaining card of the virtual deck that is not already presented as part of the poker hand. Multipliers or other modifiers may represent an enrichment, in that multipliers/modifiers can increase payouts to the player. Wild cards that also have a multiplier/modifier associated therewith provide the double benefit of increasing the chances of obtaining a winning payout, as well as offering an opportunity to increase one or more of the payouts occurring in connection with the poker hand. Enriched cards could be split cards, where multiple cards may represent a position, which is also described U.S. Pat. No. 8,323,085, entitled "Method And Apparatus For Increasing Potential Payout Opportunities In Card Games," issued Dec. 4, 2012, the content of which is hereby incorporated by reference in its entirety. Enriched cards may also include cards with credit values associated therewith, or any other card configuration providing an advantage over the card had it not been enriched.

Figure 8:
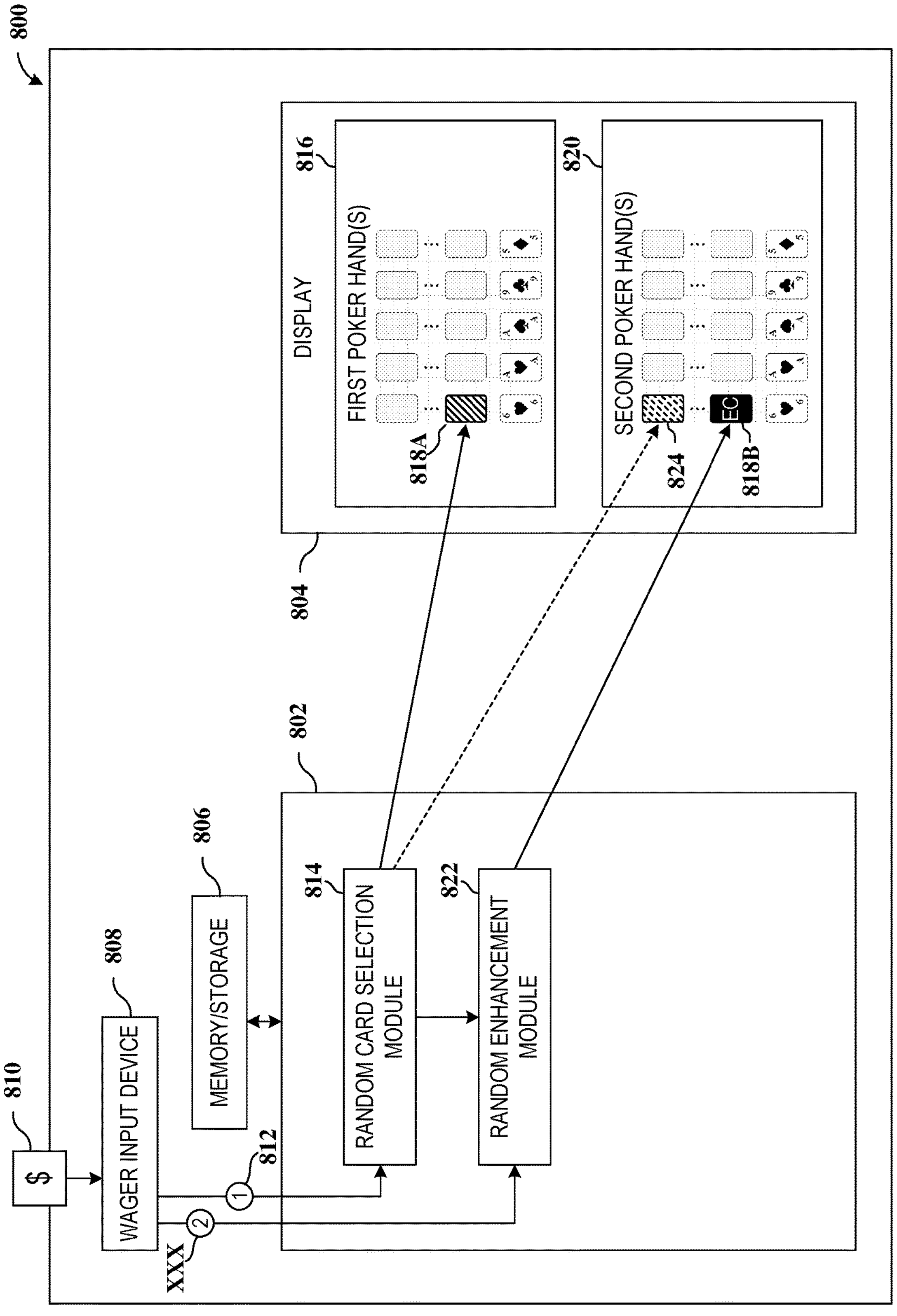
FIG. 8 depicts a representative structural example where structural components interoperate to provide subsequent hand enrichment in accordance with the disclosure.

FIG. 8 depicts a representative structural example where structural components interoperate to provide subsequent hand enrichment in accordance with the disclosure. A gaming system 800 includes at least a processor 802 (which may include one or more discrete components, local or distributed, etc.) and a display 804. A memory and/or storage 806 may store programs or other code that is executable by the processor 802. The memory/storage 806 may also store game information such as current cards in hands, card positions designated for subsequent card enrichment, enriched card values, etc. A wager input device 808 may be provided to accept player assets 810, which in one embodiment enables the player to participate in the poker games.

In one embodiment, participation in a first hand 812 utilizes a random card selection module 814, which may include a processable program stored in memory/storage 806 and executable by the processor 802. In this embodiment, the random card selection module 814 at least identifies whether or not any card positions of the first poker hand(s) 816 presented via the display 804 will be randomly designated as approved for subsequent hand enrichment, and if so, the quantity and particular card positions. In the example of FIG. 8, the random card selection module 814 may implement a random number generator or other module to randomly select card position 818A as approved for subsequent card enrichment.

The processor 802 may facilitate continued play of the first poker hand(s) 816 through its/their completion. At some point, such as after completion of the first poker hand(s) 816 (or during play of the first poker hand(s) in other embodiments), the player is enabled to play a second poker hand(s) 820 presented again on the display 804. The second poker hand(s) 820 may be displayed, for example, on a separate display section of the display 804, or on the same display section of the display 804 after the first poker hand(s) are complete, etc.

For the second poker hand(s) 820, since a card position 818A was designated for subsequent hand enrichment in the first poker hand(s) 816, that corresponding card position 818B in the second poker hand(s) 820 is dealt an enriched card (EC). For example, in a multi-play poker environment, if the first card position 818A of the second row/hand of cards in the first poker hands is designated as a card position for subsequent hand enrichment, then the first card position 818B of the second row/hand of cards in the second poker hands 820 receives an enriched card.

The random enhancement module 822 represents a programmed module, such as code stored in the memory/storage 806 and operable via the processor 802, that provides the enriched card at the designated card position 818B. The random enhancement module 822 may also determine what the enriched card will be. In one embodiment, there may be no such decision, but rather the enriched card may always be the same, such as a Wild card representing any desired card. In other embodiments, the random enhancement module 822 may select the enriched card from a set of available enrichment cards (e.g. Wild cards; Wild cards with a multiplier; Wild cards with other modifiers; standard deck cards but with a multiplier or other modifier associated therewith, etc.).

In still other embodiments, the random enhancement module selects the enriched card based on the cards that are dealt to the second poker hand(s) 820. For example, if the second poker hand(s) 820 includes a five-card hand with three Aces, the random enhancement module may determine which card will provide the best outcome given three existing Aces, such as assigning the enrichment card as another Ace. In still other embodiments, the random enhancement module 822 may identify a plurality of possible "good" cards for a particular hand of the second poker hand(s) 820, and automatically select one of such cards. In another embodiment, the player may be allowed to select among such a plurality of possible "good" cards, where in one embodiment the player is allowed to see the plurality of cards face-up and make the selection, where in other embodiments the player selects from such plurality of cards without knowledge of the card suit/rank—i.e. fact down. The random enhancement module 822 may provide these and other manners of providing an enriched card at the card position(s) 818B corresponding to that which was previously designated as a card position 818A available for subsequent enrichment.

The process of potentially designating zero, one, or more card positions in any hand of a poker play/game may continue to third poker hands, fourth poker hands, etc. This is depicted by the random card selection module 814 again identifying a card position(s), card position 824 of the second poker hand(s) 820 in this example, as a card position that will be available for card enrichment in another subsequent poker hand, such as a third poker hand(s) (not shown). Thus, the poker enrichment structure and methodology may be used for still further hands as the player plays the poker games.

Figure 9:
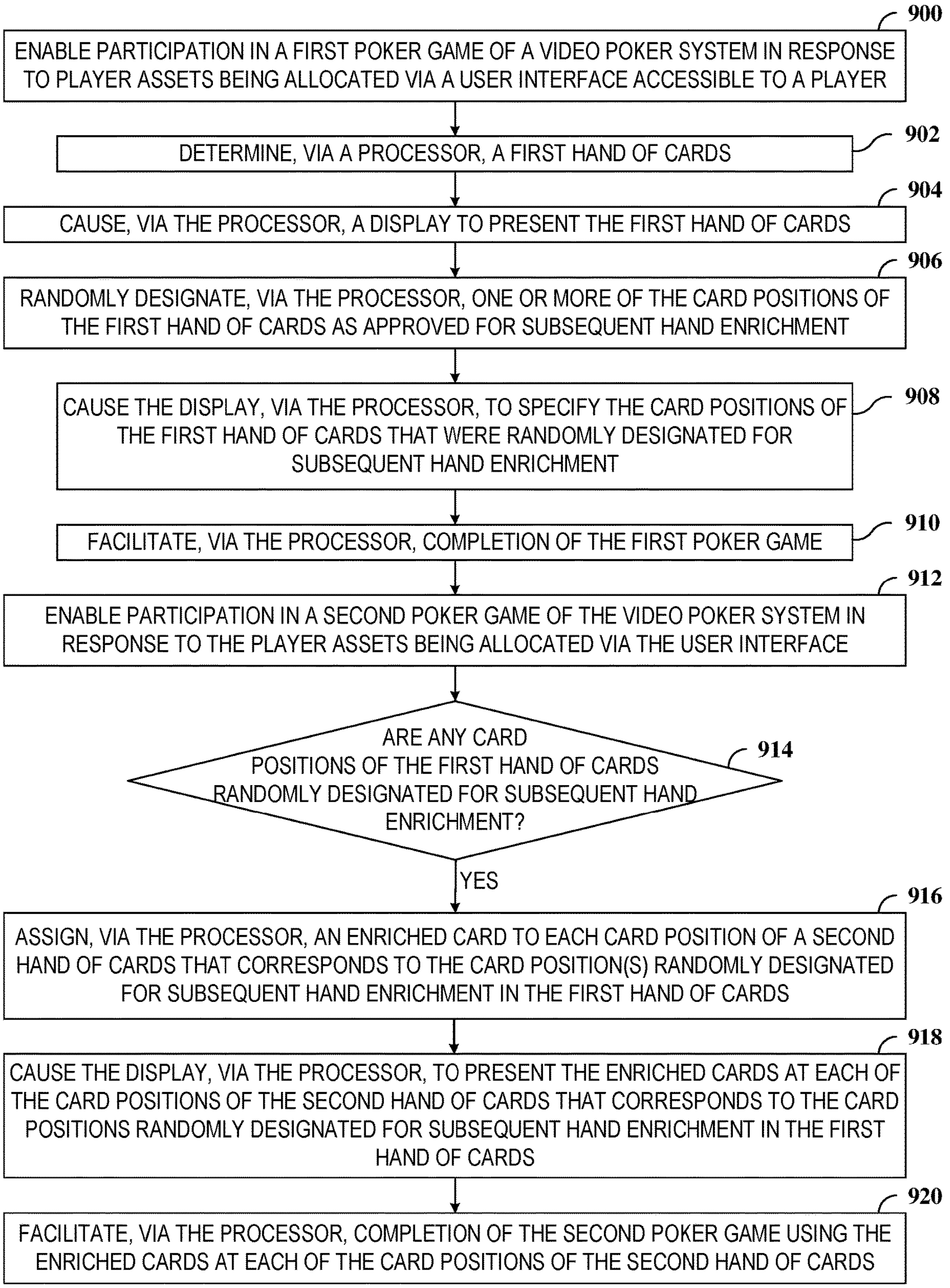
FIG. 9 is a representative structure-facilitated method for providing subsequent hand card enrichment for poker games.

FIG. 9 is a representative structure-facilitated method for providing subsequent hand card enrichment for poker games, which is also analogously applicable to other games involving at least consecutive games with gaming symbol positions. In this representative method of operating a video poker system, participation in a first poker game is enabled 900 in response to player assets being allocated via a user interface accessible to a player, and in response thereto, the processor determines 902 a first hand of cards. The processor causes 904 a display to present the first hand of cards. The processor randomly designates 906 one or more of the card positions of the first hand of cards as being approved for subsequent hand enrichment, and also causes 908 the display to specify the card positions of the first hand of cards that were randomly designated for subsequent hand enrichment.

The processor facilitates 910 completion of the first poker game, and enables 912 participation in a second poker game of the video poker system in response to the player assets being allocated via the user interface. If there are any card positions of the first hand of cards randomly designated for subsequent hand enrichment as determined at decision block 914, then the processor may assign 916 an enriched card to each of the card positions of a second hand of cards of the second poker game that corresponds to the card positions randomly designated for subsequent hand enrichment in the first hand of cards. In such case, the processor may cause 918 the display to present the enriched cards at each of the card positions of the second hand of cards that corresponds to the positions randomly designated for subsequent hand enrichment in the first hand of cards, and may further facilitate 920 completion of the second poker game using the enriched cards at each of the one or more card positions of the second hand of cards. In one embodiment, if no card positions of the first hand of cards randomly designated for subsequent hand enrichment as determined at decision block 914, then completion of the second poker game is accomplished using randomly selected cards of the deck(s), without any enriched cards (not shown).

Figure 10:
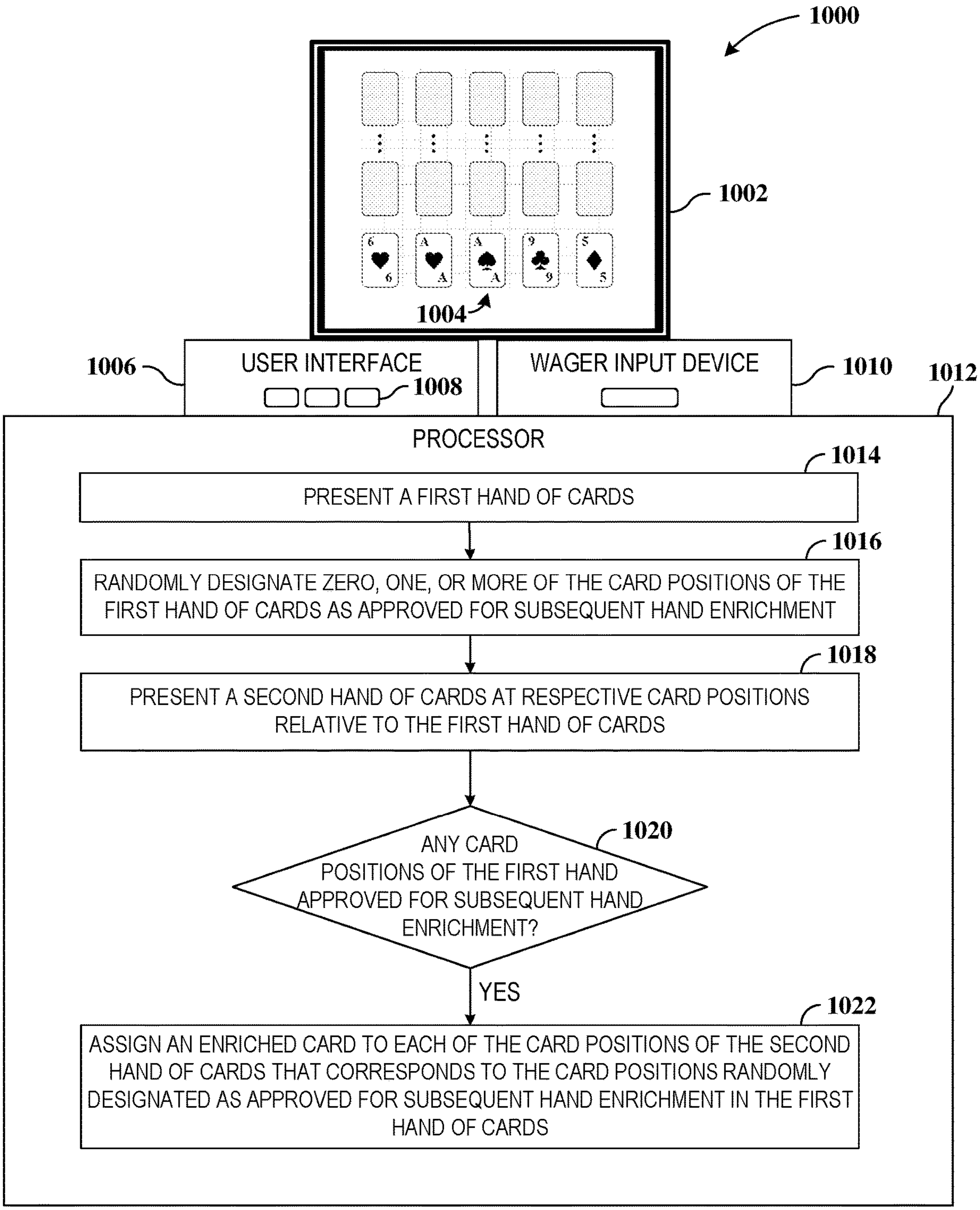
FIGS. 10 and 11 depict block diagrams of representative gaming systems for enriching subsequent poker hands based on card position designations in prior poker hands.

FIG. 10 is a block diagram of a representative gaming apparatus for enriching subsequent poker hands based on card position designations in prior poker hands. In the embodiment of FIG. 10, a gaming device 1000 for playing a poker game is provided.

The representative gaming device 1000 includes at least a display(s) 1002 presenting a single or multiple poker hands 1004. A user interface 1006 is provided that includes at least one user input 1008 to enable a player to initiate and participate in poker hands 1004 presented via the display 1002. A wager input device 1010 may be provided, which may be structured to identify and validate player assets and ultimately permit the player to play the poker game events when the player assets are provided. For purposes of illustration, the present example is described in terms of a single-hand poker game, although the principles are equally applicable to multi-play poker, such as a triple-play poker game, where multiple poker hands are presented to the player at one time, and where cards held in one hand are replicated into all of the other concurrently-played hands.

A processor 1012 is configured to, in one embodiment, present 1014 a first hand of cards, such as by causing the display 1002 to present 1014 the first hand of cards. In one embodiment, this presentation 1014 is made available in response to player assets being allocated via the wager input device 1010, or via the user interface 1006 in other embodiments. The processor is configured to randomly designate 1016 zero, one or more of the card positions of the first hand of cards as approved for subsequent hand enrichment. For example, for some poker game deals, the processor might not designate 1016 any card positions of the first hand of cards (which again, may be a single hand, or multiple hands in a multi-play environment) for subsequent hand enrichment, where in other embodiments one or more card positions may be so designated 1016.

In the illustrated embodiment, the processor 1012 presents 1018, such as causing the display 1002 to present 1018, a second hand of cards at respective card positions in response to the player assets being allocated via the wager input device 1010 to participate in the second hand of cards. If, as determined at decision block 1020, one or more of the card positions of the first hand of cards were randomly designated as approved for subsequent hand enrichment, the processor 1010 assigns 1022 an enriched card to each of the one or more card positions of the second hand of cards that corresponds to the one or more of the card positions randomly designated as approved for subsequent hand enrichment in the first hand of cards.

Figure 11:
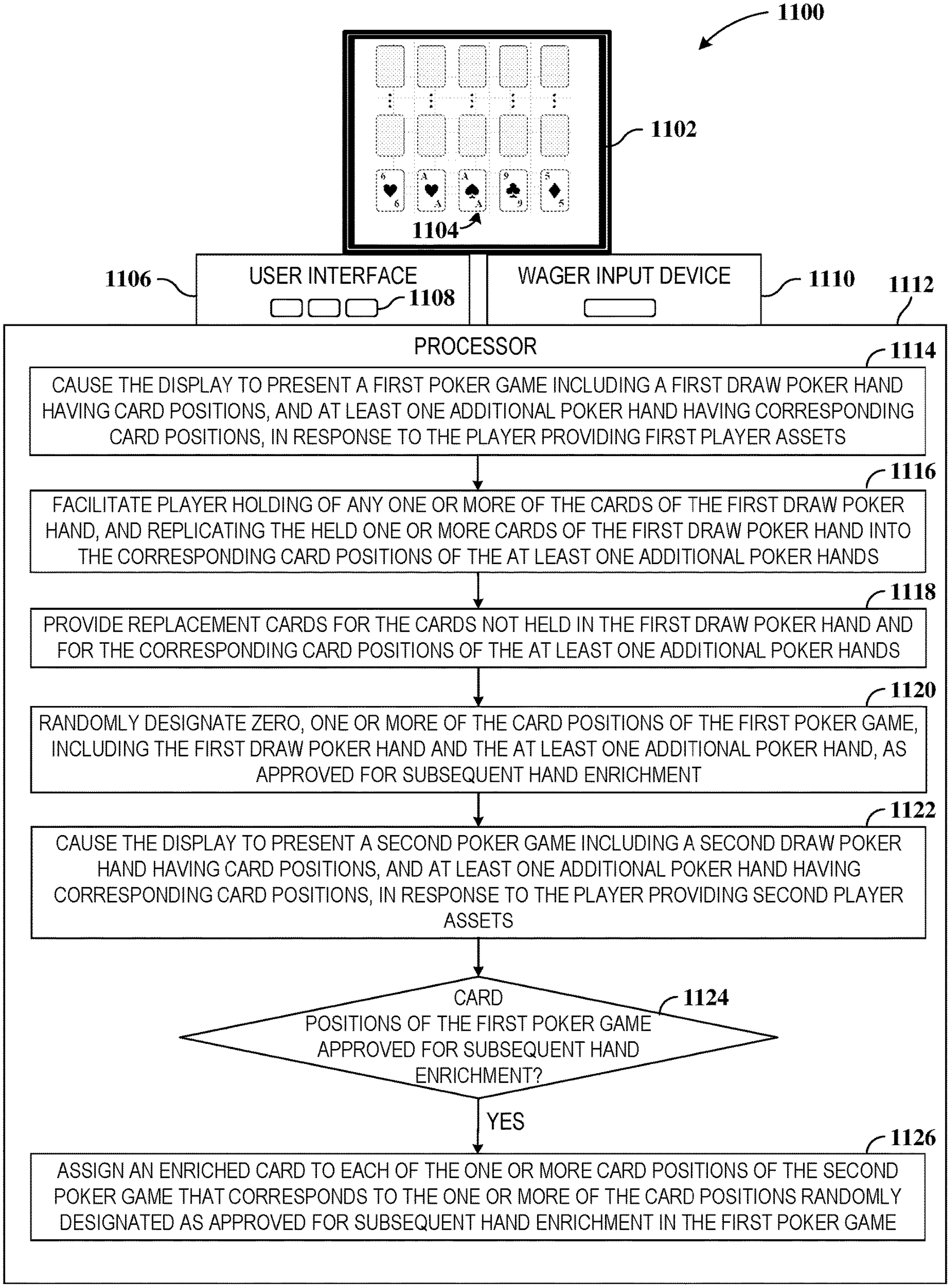

FIG. 11 is a block diagram of another representative gaming apparatus for enriching subsequent poker hands based on card position designations in prior poker hands. In the embodiment of FIG. 11, a gaming device 1100 for playing a poker game is provided. The representative gaming device 1100 includes at least a display(s) 1102 presenting a single or multiple poker hands 1104. A user interface 1106 is provided that includes at least one user input 1108 to enable a player to initiate and participate in poker hands 1104 presented via the display 1102. A wager input device 1110 may be provided, which may be structured to identify and validate player assets and ultimately permit the player to play the poker game events when the player assets are provided. For purposes of illustration, the present example is described in terms of a multi-play poker game.

In the illustrated embodiment, the processor 1112 is configured to cause 1114 the display to present a first poker game including a first draw poker hand having card positions, and at least one additional poker hand having corresponding card positions, in response to the player providing first player assets. The processor 1112 is configured to facilitate 1116 player holding of any the cards of the first draw poker hand, and replicating the held one or more cards of the first draw poker hand into the corresponding card positions of the at least one additional poker hands. Replacement cards are provided 1118 for the cards not held in the first draw poker hand and for the corresponding card positions of the at least one additional poker hands. The processor 1112 randomly designates 1120 zero, one or more of the card positions of the first poker game, including the first draw poker hand and the at least one additional poker hand, as approved for subsequent hand enrichment. The processor 1112 causes 1122 the display to present a second poker game including a second draw poker hand having card positions, and at least one additional poker hand having corresponding card positions, in response to the player providing second player assets. If one or more of the card positions of the first poker game were randomly designated as approved for subsequent hand enrichment as determined at decision block 1124, the processor 1112 assigns 1126 an enriched card to each of the one or more card positions of the second poker game that corresponds to the one or more of the card positions randomly designated as approved for subsequent hand enrichment in the first poker game. If no card positions of the first poker game were randomly designated as approved for subsequent hand enrichment as determined at decision block 1124, the second poker game is played normally without the benefit of enriched cards (not shown).

In various embodiments, the card enrichment feature may be implemented at least once on every hand, may be implemented randomly, may be implemented periodically or according to an allocation plan, may be implemented as a result of another occurrence (e.g. number of consecutive losses, consecutive wins, wager amount, etc.) and/or other established manner of providing the card enrichment feature. For example, in one embodiment, a gaming device is provided for playing an electronic/video poker game, where the gaming device includes at least a display (which may be a single or multiple presentation devices), a user interface (which may be a single or multiple player interaction devices), and a processor (which may be a single or multiple processing devices). In this embodiment, the processor is configured to cause the display to present a first hand of cards in response to player assets being allocated via the user interface to participate in the first hand of cards, and randomly designate zero, one or more of the card positions of the first hand of cards as eligible for subsequent hand enrichment. The processor is also configured to cause the display to present a second hand of cards at respective card positions in response to the player assets being allocated via the user interface to participate in the second hand of cards. If any of the card positions of the first hand of cards were randomly designated as eligible for subsequent hand enrichment, the processor is configured to assign an enriched card to each of the one or more card positions of the second hand of cards that corresponds to the one or more of the card positions randomly designated as eligible for subsequent hand enrichment in the first hand of cards.

In another embodiment, the card enrichment feature may be applied on every hand. For example, one embodiment again involves a gaming device for playing an electronic/video poker game, where the gaming device includes at least a display (which may be a single or multiple presentation devices), a user interface (which may be a single or multiple player interaction devices), and a processor (which may be a single or multiple processing devices). In this embodiment, the processor is configured to cause the display to present a first hand of cards in response to player assets being allocated via the user interface to participate in the first hand of cards, and randomly designate one or more of the card positions of the first hand of cards as eligible for subsequent hand enrichment. The processor causes the display to present a second hand of cards at respective card positions in response to the player assets being allocated via the user interface to participate in the second hand of cards, and assigns an enriched card to each of the card positions of the second hand of cards that corresponds to the one or more of the card positions randomly designated as eligible for subsequent hand enrichment in the first hand of cards.

Thus, as described herein, the disclosure herein supports poker and other gaming variants in game item positions are marked to be bettered for the player in a subsequent gaming event. The trigger may be random selection of game item positions, thereby indicating game item enrichment of some sort in connection with a future gaming event. The player could choose card locations if desired.

Players could also be afforded an opportunity to decide whether or not to keep or discard a card that has been enriched in the manners described herein. In other embodiments, enriched cards may be retained in a subsequent hand if certain rules are met, such as if that enriched card helps the player more than had the enriched card not been selected.

In other embodiments, the offering of card enrichment opportunities may be based on hand wins or hand conditions in the base game. For example, if you obtained two pair in the base game, you might be awarded one card enrichment location, if you get three-of-a-kind you might receive two card enrichment locations, if you get a straight you might get three card enrichment locations, etc.

Betting structure could be done in any desired manner. For example, the player may place a wager for a base poker game, and some additional amount to be eligible for the card enrichment features described herein. The additional amount may be a single amount to participate in all hands, or on a hand-by-hand basis, such as a particular additional wager for each hand in a multi-play poker game.

Examples include a five-credit wager for each hand in the primary poker game, plus zero additional amounts to participate in the card enrichment features (e.g., 5+0); a five-credit wager for the primary poker game, plus one additional credit for each hand played to participate in the card enrichment features (e.g., 5+1); 5+2; 5+3; 5+4; 5+5; 5+45, and so forth. For example, in a triple-play poker game (i.e. three hands concurrently played) where 5 credits are requested for each hand played and 5 additional credits for each hand to be eligible for a card enrichment trigger for subsequent hands, a total of 30 credits would be wagered (e.g., 5+5+5 for the wager for 3 primary poker hands, plus 5+5+5 to make three hands eligible for receipt of sub-symbols, highlights, or other indications for card enrichment on subsequent hands).

The foregoing description of the representative embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention covers alternatives, modifications, and equivalents that come within the scope and spirit of the principles set out herein and/or in the appended claims.

What is claimed is:

1. A of operating method a video poker gaming device including a gaming cabinet having a security lock, a display housed in the gaming cabinet and including a video screen having a poker game play grid of card positions, a player interface positioned on the gaming cabinet and including at least one button configured to generate a signal in response to being activated, a memory housed in the gaming cabinet and configured to store a virtual deck of cards and a credit amount, a wager input device positioned on the gaming cabinet and structured to receive physical items associated with currency values, and a processor housed in the gaming cabinet, the method comprising:

receiving a signal indicating receipt of a physical item associated with a currency value;

increasing the credit amount stored in the memory based on the currency value associated with the received physical item;

receiving a first game initiation signal from the player interface including a first wager amount to initiate a first poker game, the first wager amount deducted from the credit amount stored in the memory;

randomly dealing a first poker hand from the virtual deck of cards to the card positions of the poker game play grid on the display;

randomly designating zero, one or more of the card positions of the first poker hand as approved for subsequent hand enrichment;

evaluating the first poker hand for first poker awards;

increasing the credit amount stored in the memory by any first poker awards in the first poker game;

receiving a second game initiation signal from the player interface including a second wager amount to initiate a second poker game after any first poker awards in the first poker game have increased the credit amount stored in the memory, the second wager amount deducted from the credit amount stored in the memory;

randomly dealing a second poker hand from the virtual deck of cards to the card positions of the poker game play grid on the display;

determining if one or more of the card positions were previously designated as approved for subsequent hand enrichment in the first poker game;

if one or more of the card positions is determined to be designated as approved for subsequent hand enrichment, assigning an enriched card to each of the one or more card positions designated as approved for subsequent hand enrichment;

evaluating the second poker hand for second poker awards; and increasing the credit amount stored in the memory by any second poker awards.

2. The method of claim 1, further comprising visually marking the card positions on the display that were randomly designated for subsequent hand enrichment after dealing the first poker hand.

3. The method of claim 2, wherein visually marking the card positions on the display that were randomly designated for subsequent hand enrichment includes visually highlighting the card positions on the display that were randomly designated for subsequent hand enrichment.

4. The method of claim 2, wherein visually marking the card positions on the display that were randomly designated for subsequent hand enrichment includes depicting a sub-symbol on the card positions on the display that were randomly designated for subsequent hand enrichment.

5. The method of claim 1, wherein assigning an enriched card to each of the one or more card positions designated as approved for subsequent hand enrichment includes replacing the cards dealt in the second poker game to the one or more designated card positions with wild cards.

6. The method of claim 5, further comprising determining if a random multiplier is to be assigned to each of the wild cards that replace the each of the one or more card positions designated as approved for subsequent hand enrichment in the second poker game.

7. The method of claim 1, wherein the memory is further configured to store a plurality of possible enriched cards.

8. The method of claim 7, further comprising randomly determining which of the plurality of possible enriched cards to use for each of the card positions designated as approved for subsequent hand enrichment.

9. The method of claim 7, further comprising selecting the specific enriched cards for each of the card positions designated as approved for subsequent hand enrichment based on other cards in the second poker hand.

10. The method claim 1, wherein the poker game comprises a stud poker game.

11. The method claim 1, wherein the poker game comprises a draw poker game.

12. A video poker gaming device comprising:

a gaming cabinet having a security lock;

a display housed in the gaming cabinet, the display including a video screen having a poker game play grid of card positions;

a player interface positioned on the gaming cabinet, the player interface including at least one button, the button configured to generate a signal in response to being activated;

a memory housed in the gaming cabinet, the memory configured to store a virtual deck of cards and a credit amount;

a wager input device positioned on the gaming cabinet, the wager input device structured to receive physical items associated with currency values; and a processor housed in the gaming cabinet, the processor operable to:

receive a signal indicating receipt of a physical item associated with a currency value;

increase the credit amount stored in the memory based on the currency value associated with the received physical item;

receive a first game initiation signal from the player interface including a first wager amount to initiate a first poker game, the first wager amount deducted from the credit amount stored in the memory;

randomly deal a first dealt poker hand from the virtual deck of cards to the card positions of the poker game play grid on the display;

randomly designate zero, one or more of the card positions of the poker game play grid as approved for subsequent hand enrichment;

provide an opportunity to hold any of the cards in the first dealt poker hand;

randomly deal replacement cards from the virtual deck of cards to any card positions that are not associated with held cards to form a first final poker hand;

evaluate the first final poker hand for first poker awards;

increase the credit amount stored in the memory by any first poker awards in the first poker game;

receive a second game initiation signal from the player interface including a second wager amount to initiate a second poker game after any first poker awards in the first poker game have increased the credit amount stored in the memory, the second wager amount deducted from the credit amount stored in the memory;

if one or more of the card positions were previously designated as approved for subsequent hand enrichment in the first poker game, assign an enriched card to each of the one or more card positions designated as approved for subsequent hand enrichment;

randomly deal virtual cards from the virtual deck of cards to any remaining card positions on the poker game play grid on the display that do not include enriched cards to form a second dealt poker hand;

provide an opportunity to hold any of the cards in the second dealt poker hand;

randomly deal replacement cards from the virtual deck of cards to any card positions that are not associated with held cards to form a second final poker hand;

evaluate the second final poker hand for second poker awards; and increase the credit amount stored in the memory by any second poker awards.

13. The video poker gaming device of claim 12, wherein the processor is further operable to visually mark the card positions on the display that were randomly designated for subsequent hand enrichment after dealing the first poker hand.

14. The video poker gaming device of claim 13, wherein visually marking the card positions on the display that were randomly designated for subsequent hand enrichment includes visually highlighting the card positions on the display that were randomly designated for subsequent hand enrichment.

15. The video poker gaming device of claim 13, wherein visually marking the card positions on the display that were randomly designated for subsequent hand enrichment includes depicting a sub-symbol on the card positions on the display that were randomly designated for subsequent hand enrichment.

16. The video poker gaming device of claim 12, wherein assigning an enriched card to each of the one or more card positions designated as approved for subsequent hand enrichment includes providing the one or more designated card positions with wild cards.

17. The video poker gaming device of claim 16, wherein the processor is further operable to determine if a random multiplier is to be assigned to each of the provided wild cards.

18. The video poker gaming device of claim 12, wherein the memory is further configured to store a plurality of possible enriched cards.

19. The video poker gaming device of claim 18, wherein the processor is further operable to randomly determine which of the plurality of possible enriched cards to use for each of the card positions designated as approved for subsequent hand enrichment.

20. The video poker gaming device of claim 18, wherein the processor is further operable to select the specific enriched cards for each of the card positions designated as approved for subsequent hand enrichment based on other cards in the second poker hand.

* * * * *